US009375591B2

(12) United States Patent
Goddard et al.

(10) Patent No.: US 9,375,591 B2
(45) Date of Patent: Jun. 28, 2016

(54) AERIAL DELIVERY DEVICES, SYSTEMS AND METHODS

(71) Applicant: Caylym Technologies International, LLC, San Diego, CA (US)

(72) Inventors: Richard Goddard, Hanford, CA (US); James Tadlock, Olympia, WA (US); Kyle Goddard, Fresno, CA (US); Michael Periongo, Aliso Viejo, CA (US)

(73) Assignee: Caylym Technologies International, LLC, Hanford, CA (US)

(*) Notice: Subject to any disclaimer, the term of this patent is extended or adjusted under 35 U.S.C. 154(b) by 429 days.

(21) Appl. No.: 13/935,293

(22) Filed: Jul. 3, 2013

(65) Prior Publication Data

US 2013/0292142 A1 Nov. 7, 2013

Related U.S. Application Data

(60) Continuation-in-part of application No. 13/577,064, filed on Aug. 3, 2012, which is a division of application No. 12/785,340, filed on May 21, 2010, now Pat. No. 8,480,034.

(60) Provisional application No. 61/182,677, filed on May 29, 2009.

(51) Int. Cl.

| | |
|---|---|
| ***B64C 1/22*** | (2006.01) |
| ***B64D 1/08*** | (2006.01) |
| ***B64D 9/00*** | (2006.01) |
| ***B64D 1/12*** | (2006.01) |
| ***A62C 3/02*** | (2006.01) |
| ***A62C 31/00*** | (2006.01) |

(52) U.S. Cl.
CPC ............... *A62C 3/0235* (2013.01); *A62C 31/00* (2013.01)

(58) Field of Classification Search
CPC .... A62C 3/0228; A62C 3/0235; A62C 31/00; B64D 1/16; B64D 1/02; B64D 1/08; B64D 1/12; B64D 17/38
See application file for complete search history.

(56) References Cited

U.S. PATENT DOCUMENTS

| | | | |
|---|---|---|---|
| 2,306,321 | A | 12/1942 | Roberts |
| 2,784,895 | A | 3/1957 | Linwood, Jr. et al. |
| 3,066,842 | A | 12/1962 | Croley |
| 3,401,905 | A | 9/1968 | Rohrlick |
| 3,485,302 | A | 12/1969 | Thorpe |
| 3,603,536 | A | 9/1971 | Dochow |
| 3,655,116 | A | 4/1972 | Tanner |
| 3,710,868 | A | 1/1973 | Chadwick |
| 3,741,462 | A | 6/1973 | Flint et al. |

(Continued)

OTHER PUBLICATIONS

Flexible Attack Innovations, "PCADS—New Generation of Aerial Fire Fighting", http://www.flexattack.com/pcads/, Dec. 4, 2015, 7 pages.

*Primary Examiner* — Philip J Bonzell
(74) *Attorney, Agent, or Firm* — Stetina Brunda Garred & Brucker

(57) ABSTRACT

A firefighting device has a rigid sleeve and an inner bladder within the sleeve. The bladder is rupturable with a pair of bladder straps attached to the bladder which is pulled upon by a pair of lid straps attached to a lid when the firefighting device is released from a forward moving aircraft. Additionally, the sleeve may have a pair of sleeve straps which are connected to a lower half of the sleeve and the lid straps to facilitate rotation of the device when the device is released from the forward moving aircraft.

13 Claims, 22 Drawing Sheets

(56) References Cited

U.S. PATENT DOCUMENTS

| | | | |
|---|---|---|---|
| 3,853,235 | A | 12/1974 | Lambert et al. |
| 3,904,105 | A | 9/1975 | Booth |
| 4,169,568 | A | 10/1979 | Drew et al. |
| 4,194,652 | A | 3/1980 | Williamson et al. |
| 4,664,342 | A | 5/1987 | Jones |
| 4,807,299 | A | 2/1989 | Nattrass et al. |
| 4,865,273 | A | 9/1989 | Jones |
| 4,919,306 | A | 4/1990 | Heaps, Jr. et al. |
| 5,012,972 | A | 5/1991 | Nordstrom et al. |
| 5,618,011 | A | 4/1997 | Sadeck et al. |
| 6,470,805 | B1 | 10/2002 | Woodall et al. |
| 7,090,029 | B2 | 8/2006 | Cleary et al. |
| 9,138,604 | B2 | 9/2015 | Cleary et al. |
| 2003/0215165 | A1 | 11/2003 | Hogan et al. |
| 2007/0090174 | A1 | 4/2007 | Goddard |
| 2010/0018724 | A1 | 1/2010 | Cleary et al. |

AERIAL DELIVERY DEVICES, SYSTEMS AND METHODS

CROSS-REFERENCE TO RELATED APPLICATIONS

This application is a continuation in part patent application of U.S. patent application Ser. No. 13/577,064, filed on Jul. 24, 2012 which is a divisional patent application of U.S. patent application Ser. No. 12/785,340, filed on May 21, 2010 which claims the benefits of U.S. Pat. App. Ser. No. 61/182, 677, filed on May 29, 2009, the entire contents of which are expressly incorporated herein by reference.

The entirety of U.S. patent application Ser. No. 11/246, 507, filed Oct. 7, 2005 and published on Apr. 26, 2007 as U.S. Pub. No. 2007/0090174, is hereby incorporated by reference herein.

STATEMENT RE: FEDERALLY SPONSORED RESEARCH/DEVELOPMENT

Not Applicable

BACKGROUND

This application relates generally to devices, systems and methods for selectively delivering water, other liquids, other solids and/or other materials to a target location.

Wild fires have increased in average size about 20% in the last five years. In the last twenty years, the average size of a wild fire has increased by 60%. In the United States, the average cost of a wild fire is about 6.5 million dollars. Beyond the monetary cost, wild fires also have a significant and lasting environmental impact. In particular, every acre that is burned of medium density fuel, more than fifty tons of hydrocarbon and toxic gases may be released into the atmosphere.

Currently, to fight wild fires, an aircraft is used to deploy water and fire retardant chemicals at or around the wild fire to contain the wild fire or put out the wild fire. The aircraft serving to put out the wild fire is typically a retired aircraft serving a "second life". The retired aircraft is reconfigured and maintained for single mission use, namely, fighting wild fires. The aircraft drops the water and/or fire retardant chemicals on the fire or locations around the fire to contain the fire. To this end, the aircraft flies very close to the ground location or target location to ensure that the water and fire retardant chemicals dispersed in the air reach the target location. If the aircraft is too high above the target location, then the dispersed water and/or fire retardant chemicals may be blown over a large area so that its concentration may be ineffective at containing the fire or putting out the fire. Accordingly, the aircraft must perform a nap of the Earth flying maneuver wherein the aircraft flies very close to the ground or fire location. Unfortunately, due to this dangerous flight profile, the aircraft may operate only when visibility is clear, during daylight and within a limited daylight range. The aircraft cannot fly during night hours or during heavy winds. Additionally, when the fire is located within a canyon, the reduced daylight hours due to the canyon angles further limit the operational time of the aircraft. The weather and winds may also prevent or limit operation of the aircraft to deploy water and/or fire retardant chemicals.

Accordingly, there is a need in the art for an improved device, system and method for selectively delivering water, the liquid and/or other material to a target location utilizing conventional cargo aircraft currently readily available in the existing inventory of aircrafts.

BRIEF SUMMARY

The system disclosed herein addresses the needs discussed above, discussed below and those that are known in the art.

A fire fighting device contains a fire retardant material within a rupturable bladder. The bladder is contained within a sleeve which the sleeve and the bladder are placed on a platform. The bladder is ruptured by way of bladder straps secured to a wall of the bladder. When the bladder straps are pulled, the bladder is ruptured to release the fire retardant material. The device may also have a pair of sleeve straps which are secured to a lower half of the sleeve. The straps are disposed exterior to the sleeve so that when the sleeve straps are pulled upward, the device is rotated. The device may also have a lid which functions as a parachute so that the lid catches a slip stream of a forward moving aircraft when the device is released from the forward moving aircraft. The lid has a pair of straps which are attached to the bladder straps and the sleeve straps to pull up thereon to rupture the bladder and rotate the device to facilitate dispersion of the fire retardant material at about the same time when the device is released from the forward moving aircraft.

According to certain embodiments, an aerial delivery system configured to be deployed from an aircraft comprises a base, a sleeve generally configured to be positioned on the base, a bag configured to receive at least one liquid and a lid assembly attached to the bag using at least one strap. In some embodiments, the strap is attached to the bag in a manner that causes the bag to be selectively compromised once the aerial delivery system is deployed from an aircraft. In one embodiment, the system comprises a cellulose-based material. In other arrangements, the bag comprises polypropylene or a poly based film structure including but not limited to bio degradable materials which have a form of poly with other "plasticized" film materials.

According to certain embodiments, an aerial delivery system configured to be deployed from an aircraft comprises a base, a sleeve generally configured to be positioned on the base, a bag configured to receive at least one liquid and a lid assembly attached to the bag using at least one strap. The strap may be attached to the bag in a manner that causes the bag to be selectively compromised (e.g., torn, ripped, etc.) once the aerial delivery system is deployed from an aircraft, thereby releasing the bag's interior contents (e.g., water, chemical retardants, other liquids or materials, etc.) to the environment. The strap may be a two-part strap wherein the first part of the strap is attached to the bag. The second part of the strap is attached to the lid assembly. The first and second parts of the strap are not attached to each other initially. However, when the system is ready to be deployed (i.e., dropped from the aircraft) such as to fight a fire, distal ends of the first and second parts of the straps are attached to each other thereby arming the aerial delivery system. When the aerial delivery system is deployed from the aircraft, the system falls toward the ground. Airflow catches the lid assembly of the system which behaves like a parachute. The bag with the fire retardant or water contained therein accelerates toward the ground while the lid assembly is prevented from freefalling toward the ground. This creates tension on the strap connecting the lid assembly and the bag. The tension in the strap is increased until the bag ruptures thereby releasing its content to the desired location. The bag may rupture when the bag is significantly below the elevation of the aircraft. This is accomplished by providing a sufficiently long strap so that tension within the strap is delayed. In this manner, the aircraft may fly at a high elevation, release the aerial delivery system which will fall toward the ground or desired location a significant distance before the strap is tensioned, the bag is ruptured and the contents within the bag are dispersed at or toward the desired location at a lower elevation.

More particularly, an aerial delivery system for dispersing a filler material to a target location is disclosed. The system may comprise a rupturable container, a parachute and an elongate strap. The rupturable container may hold the filler material. The parachute may be disposed adjacent to the container. The elongate strap may be permanently attached to the parachute and secured to the rupturable container. The strap may be sufficiently long to delay rupture of the rupturable container until the container is significantly below the aircraft wherein the strap ruptures the rupturable container when the parachute catches airflow as the system is dropped from the aircraft.

The strap may comprise parachute and container strap members which are initially detached from each other and attachable to each other before dropping the system toward the target location to arm the system. The parachute strap member may be attached to the parachute. The container strap member may be attached to the rupturable container. The distal end portions of the parachute and container strap members may have loops which are securable to each other. The loops of the parachute and container strap members may be securable to each other with zip ties, hooks and loops (e.g., VELCRO), and/or various adhesive tape products.

The rupturable container may be a polyethelene bag or a poly based film depending on the liquid payload material compatibility. The system may further comprise a sleeve or tote to support the rupturable container when storing the filler material in the rupturable container prior to dropping the system toward the target location. The sleeve may have a belly band for mitigating bulge of the sleeve when the filler material is contained in the rupturable container. The sleeve may have a locking top or partial enclosure for retaining the filler material within the sleeve during eratic aircraft movement.

The parachute and the elongate strap may form a cap assembly wherein the cap assembly includes an underlayer with a plurality of holes; first and second parachute straps disposed through the holes to form a criss-cross pattern on top of the underlayer; and a cap disposed on top of the underlayer and secured to the underlayer.

Instead of a poly film bag, the rupturable container may be a sleeve or tote. The strap may be attached to an interior side of the rupturable container. More particularly, the strap may be attached to an upper half of the interior side of the rupturable container.

A method of dispersing material to a target location with an aircraft is also disclosed. The method may comprise the steps of providing an unarmed system including a rupturable container, a parachute and a strap attached to the parachute and the rupturable container; filling the rupturable container with the material; loading the system onto an aircraft; prior to dropping the rupturable container from the aircraft, arming the system; and dropping the system from the aircraft toward the target location.

The arming step may comprise attaching a parachute strap member which is attached to the parachute to a container strap member which is attached to the container. The attaching step may include the step of securing loops of the parachute and container strap members to each other.

An aerial delivery system configured to be deployed from an aircraft is also disclosed. The system may comprise a base; a sleeve generally configured to be positioned on the base; a bag configured to receive at least one liquid; and a lid assembly attached to the bag using at least one strap; wherein the at least one strap is attached to the bag in a manner that causes the bag to be selectively compromised once the aerial delivery system is deployed from an aircraft. The system may comprise a cellulose-based material. The bag may also be polypropylene, polyethelene, polyvinyl-chloride or other poly based film depending on payload material compatibility.

In another embodiment, a fire fighting device released from a forward moving aircraft is disclosed. The device may comprise a rupturable inner bladder, a first bladder strap, an exterior sleeve, a first sleeve strap, a lid, and a first lid strap. The rupturable inner bladder may contain fire fighting material. The inner bladder may define a lower surface. The first bladder strap may define first and second portions. The first portion of the first bladder strap may be secured to the lower surface of the inner bladder. The second portion may have a first bladder strap connector. The exterior sleeve may contain the rupturable inner bladder and may be sufficiently rigid to minimize bulging of the sleeve when the inner bladder contains the fire fighting material. The first sleeve strap may define first and second portions. The first portion may be attached to a lower half of the sleeve. The first sleeve strap may be disposed exterior to the sleeve. The second portion may have a first sleeve strap connector. The lid may have a sufficiently large surface area to catch a slip stream of the forward moving aircraft for rotating the fire fighting device. The first lid strap may define first and second portions. The first portion may be attached to the lid. The second portion may have a first lid strap connector. The first bladder strap connector and the first lid strap connector may be connected so that the lid pulls up on the lower half of the sleeve to rotate the device after being released from the forward moving aircraft.

The device may further comprise a second bladder strap, a second sleeve strap and a second lid strap. The second bladder strap may define first and second portions. The first portion of the second bladder strap may be secured to the lower surface of the inner bladder. The second portion may have a second bladder strap connector. The second sleeve strap may be positioned adjacent to the first sleeve strap. The second sleeve strap may define first and second portions. The first portion may be attached to a lower half of the sleeve. The second sleeve strap may be disposed exterior to the sleeve. The second portion may have a second sleeve strap connector. The second lid strap may define first and second portions. The first portion may be attached to the lid. The second portion may have a second lid strap connector. The second bladder strap connector and the second lid strap connector may be connected to the second sleeve strap connector for arming the system.

The first portions of the first and second bladder straps are the distal end portions of a unitary elongate material which are secured to the lower surface about 4 inches past a center of the lower surface of the bag. The second portions of the first and second bladder straps are the distal end portions of a unitary elongate material which are secured to the lower surface of the bag about 4 inches past the center of the lower surface. The first and second bladder straps may extend outward in opposite directions.

The first and second sleeve straps may be positioned on adjacent sides of the sleeve having a common corner. The first and second sleeve straps may be positioned closer to the common corner than the opposed corners of the adjacent sides of the sleeve.

The first lid strap may have opposed end portions that extend outward from the lid in opposite directions. The opposed end portions of the first lid strap may have a pair of first lid strap connectors. The second lid strap may have opposed end portions that extend outward from the lid in opposite directions and may be generally perpendicular to the first lid strap. The opposed end portions of the second lid strap may have a pair of second lid strap connectors.

The device may further comprise a platform for supporting the sleeve and the inner bladder. The sleeve may be secured to the platform.

The device may further comprise an upper rupturable panel disposed over an upper opening of the sleeve to retain the inner bladder filled with fire fighting material when the forward moving aircraft maneuvers to impose a negative gravity environment.

The first bladder strap may be routed to an exterior envelope of the sleeve through the rupturable gusset.

The first bladder strap connector, the first sleeve strap connector and the first lid strap connector may each have a loop at distal ends thereof.

The device may further comprise zip ties, hooks and loops (e.g., VELCRO) and/or various adhesive tape products for connecting the first bladder strap connector, the first sleeve strap connector and the first lid strap connector together to arm the device for deployment.

In another aspect, a method of dropping firefighting material onto a fire is disclosed. The method may comprise the steps of providing an apparatus having an outer support and an inner bladder, the bladder being fillable with the firefighting material, the outer support capable of propping up the bladder after being filled with firefighting material and for facilitating transportation of the filled inner bladder; loading the filled apparatus onto an airplane; unloading the filled apparatus off of a rear access ramp of the airplane while the airplane is in flight; destabilizing the filled apparatus after the unloading step; and extracting the firefighting material from the outer support.

The destabilizing step may comprise the steps of catching a parachute of the apparatus in a slip stream of the aircraft; and pulling up on one or more parachute lines routed from the parachute into a lower half of the support to destabilize the apparatus and disburse the firefighting material within the inner bladder onto the fire.

The extracting step may comprise the steps of ripping the inner bladder with the one or more parachute lines which are secured to the inner bladder.

The extracting step may comprise the steps of ripping a bottom portion of the inner bladder with the one or more parachute lines which are secured to the bottom portion of the inner bladder.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
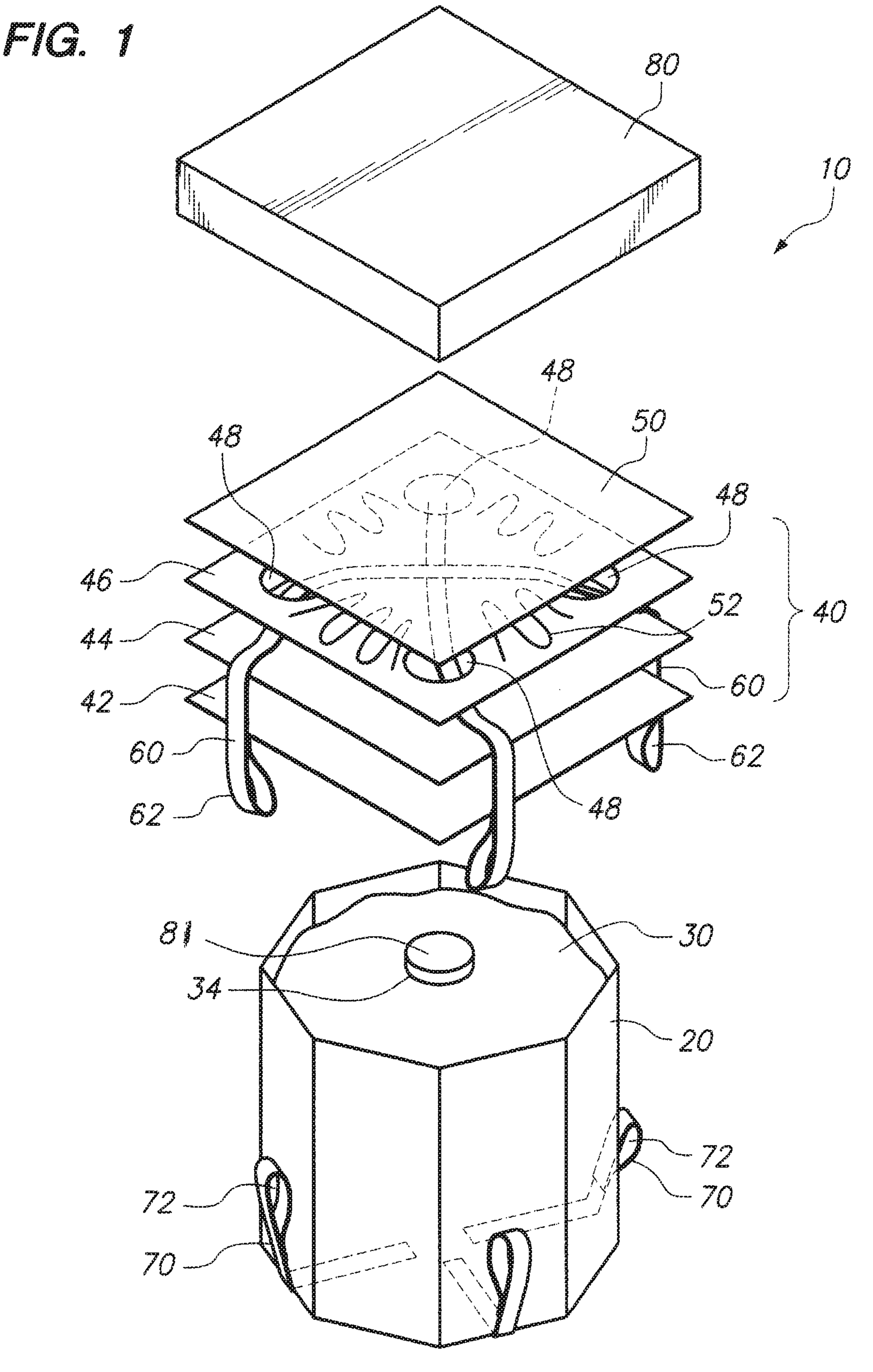
FIG. 1 illustrates a partial exploded perspective view of various components of an aerial delivery system configured to receive and retain water and/or other materials according to one embodiment.

FIG. 1 illustrates an exploded perspective view of an aerial delivery system 10 that is configured to receive water, fire retardant chemicals, pollution control substances and/or any other materials. As discussed in greater detail herein, the systems 10, together with the substances placed and contained therein, can be selectively delivered to a targeted location via an airplane, helicopter and/or any other type of aircraft. For example, one or more aerial delivery systems can be dropped over a fire as part of a firefighting effort, on an oil spill or other contaminated area as part of a cleanup effort and/or the like. However, although the various embodiments disclosed herein may be discussed with specific reference to firefighting or cleanup events, the features, advantages and other characteristics related to such embodiments can be used to selectively deliver one or more liquids, items and/or any other substance to a target ground location, as desired or required.

Figure 2:
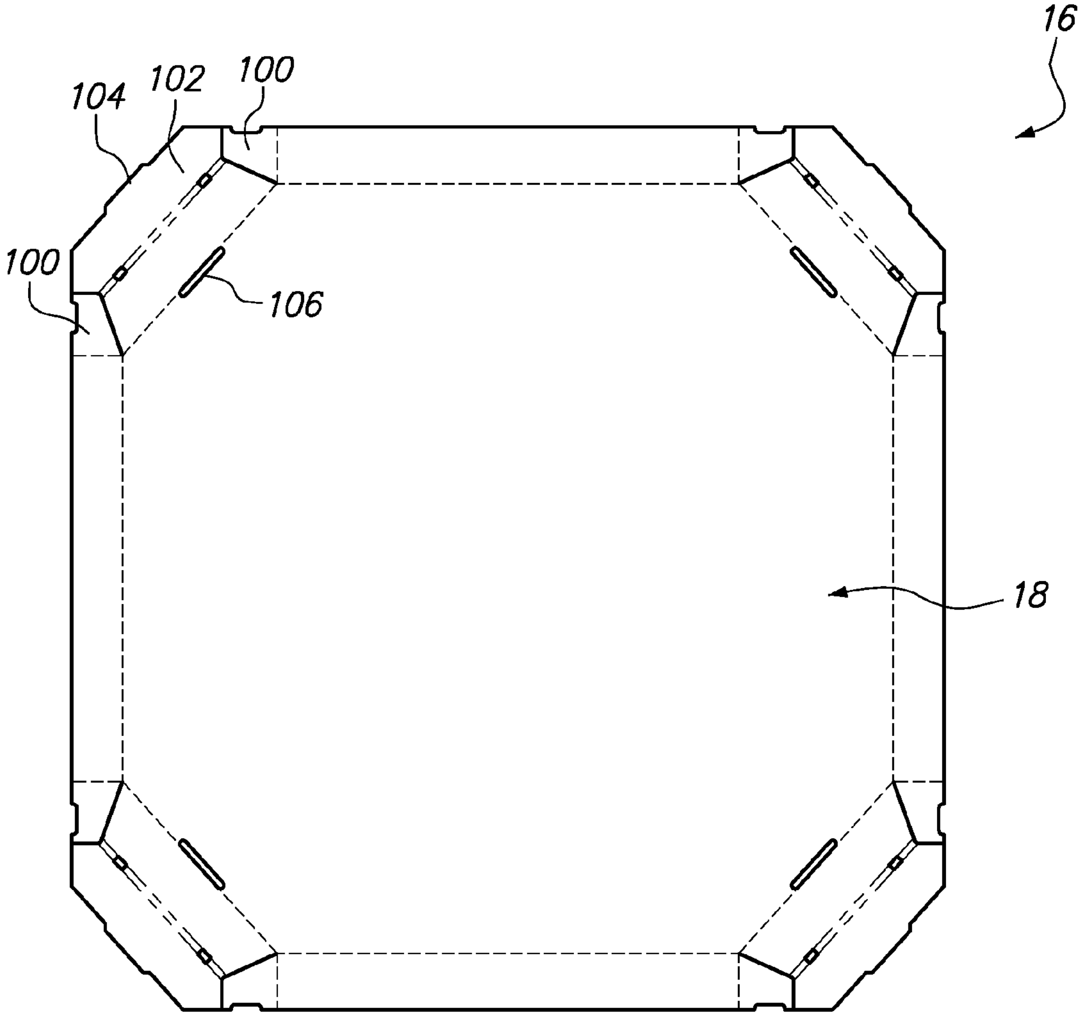
FIG. 2 illustrates a top view of an unfolded base configured for use with the aerial delivery system of FIG. 1 according to one embodiment.
Figure 2A:
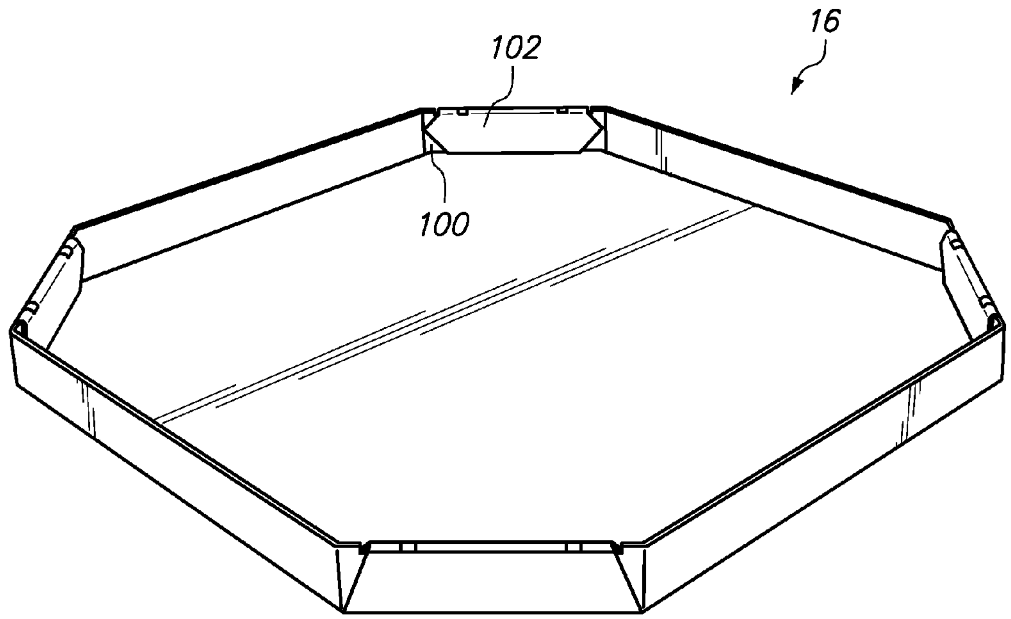
FIG. 2A is a perspective view of the base shown in FIG. 2 in a folded configuration.

With continued reference to FIG. 1, the aerial delivery system 10 can include a sleeve or sidewall portion 20 that rests on a tray 16 (see FIGS. 2 and 2A). As depicted in FIG. 1, the sleeve 20 can comprise an octagonal cross-sectional shape when assembled, defining an interior shape adapted to receive a bag 30 (e.g., "pillow" style bag) or other container. In other embodiments, however, the sleeve 20 or sidewall portion of the system 10 includes a different cross-sectional shape, such as, for example, square, rectangular, triangular, other polygonal, circular, oval and/or the like, as desired or required for a particular application or use. By way of example and not limitation, the physical envelope of the system 10 may be approximately 48 inches wide by 48 inches long by 38 inches high. Also, the sleeve 20 may have a physical envelope of 42 inches wide by 42 inches long and 36 inches high with 12 inch corner panels so as to provide the sleeve 20 with an octagonal configuration. The unfilled weight of the system 10 may be about 25 lbs.

The aerial delivery system 10 can additionally comprise a lid assembly 40 adapted to be positioned above or on top of the sleeve 20 and bag 30. As shown in FIG. 1, the lid assembly 40 can include one or more separate layers 42, 44, 46. In the illustrated embodiment, one or more upper layers 46 of the lid assembly 40 comprises a plurality of holes, slots or other openings 48 through which one or more straps 60 can be routed. Two straps 60 may be fed through opposing holes 48 so as to form a crisscross pattern above the upper layer 46. When the aerial delivery system 10 is dropped from an aircraft 92, the lid assembly 40 behaves like a parachute while the bag 30 and its contents accelerate toward the ground. The resistance of the lid assembly 40 places tension on the strap 60 and ultimately ruptures the bag 30. A significant amount of tension may be placed upon the strap 60. Nonetheless, due to the crisscross configuration of the strap 60 as shown in FIG. 1, the layers 42, 44 and 46 do not delaminate away from the strap 60 but are held in place (e.g., centered on the layers 42, 44) in a sturdy and stable manner. Additionally, the layers 42, 44 may each be fabricated from a triplewall corrugated material as described herein for added rigidity. Also, the layers 42, 44 may be about 47" by 47". The layers 42, 44 may have its corrugation set orthogonally or 90 degrees to each other. The layers 42, 44 may be laminated to each other in this orthogonal position so as to form a superior tear resistant bond. It is also contemplated that only one of either layer 42 or 44 be disposed under the straps 60 so long as such layer 42 or 44 is strong enough. Additional layers with its corrugation set orthogonal to adjacent layers are also contemplated so as to increase strength.

The straps 60 can be connected, either directly or indirectly (e.g., via other straps 70) to the bag 30 or other container placed within the interior of the system's sleeve 20 or sidewall portion. The straps 60, 70 may be fabricated from cotton or other generally non stretch fabric or material. The collective length of the straps 60, 70 may be about 40 feet long with each of the straps 60, 70 being about 2" wide. As discussed in greater detail herein, an upward force on the straps 60, 70 can cause the bag 30 or other container to tear, rip and/or otherwise become compromised, thereby releasing its interior contents (e.g., water, chemicals, oil absorbent material, etc.) from the system 10.

The lid assembly 40 can include one or more strap laminate covers 50 that help ensure that the straps 60 are securely maintained along the top surface of the uppermost layer 46 of the lid assembly 40 and eliminate exposed straps 60 from the top of the system 10 which eases material handling requirements and problems. The straps 60 may be disposed between the upper layer 46 and the cover 50 with the upper layer 46 laminated to the strap laminate cover 50 with adhesive 52. Also, the straps 60 themselves may be laminated to either one or both of the strap laminate cover 50 and the upper layer 46 with adhesive. It is also contemplated that the strap 60 may be disposed between the cap 80 and the upper layer 46. The cover 50 is not required and may be eliminated. The upper layer 46 may be laminated to the bottom surface of the cap 80 to contain the straps 60 in place. Additionally or alternatively, the straps 60 may also be laminated to one or both of the under surface of the cap 80 and the upper layer 46. In addition, in some arrangements, the cap 80 or other covering member may be removably positioned over the lid assembly 40. For sizing purposes, the lid assembly 40 and the cap 80 may for example be sized so as to have the same planar footprint as the skid 18. It is also contemplated that the cap 80 and the upper layer 46 may be fabricated from a single wall corrugated material as discussed herein.

Figure 6:
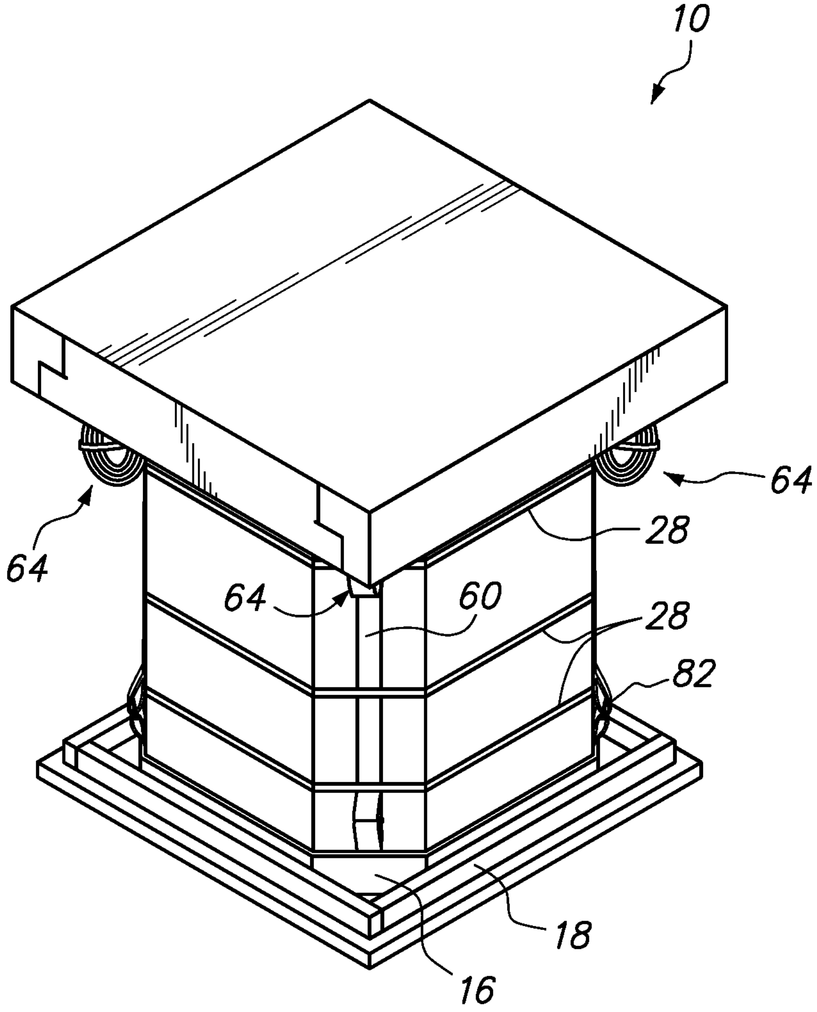
FIG. 6 is a perspective view of the system shown in FIG. 1 wherein the system is armed and ready to be deployed.

FIGS. 2 and 2A illustrate a tray 16 that is configured to receive the sleeve 20, bag 30 and any other portion of the aerial delivery system 10. The unfolded tray (see FIG. 2) 16 may be erected so as to form a walled tray 16 as shown in FIG. 2A. In particular, flap 100 may be folded inward and flaps 102 may be folded over flap 100 with tabs 104 inserted into aperture 106. The tray 16 may be shaped, sized and otherwise adapted to accommodate the sleeve 20, bag 30 and/or other components of the system 10, as shown in FIG. 6. The tray 16 may or may not be connected to one or more other components of the aerial delivery system 10, as desired or required. For example, the tray 16 can be attached, at least temporarily (e.g., before the deployment from an aircraft), to the sleeve 20 and the bag 30 using a friction-based connection. In other arrangements, one or more other types of connection devices or methods are used to ensure that the tray 16 remains at least temporarily secured to one or more other portions of the system, either in lieu of or in addition to a friction connection. For example, adhesives, screws, tabs, clips and/or other fasteners and/or any other device or method can be used, as desired or required.

Figure 5:
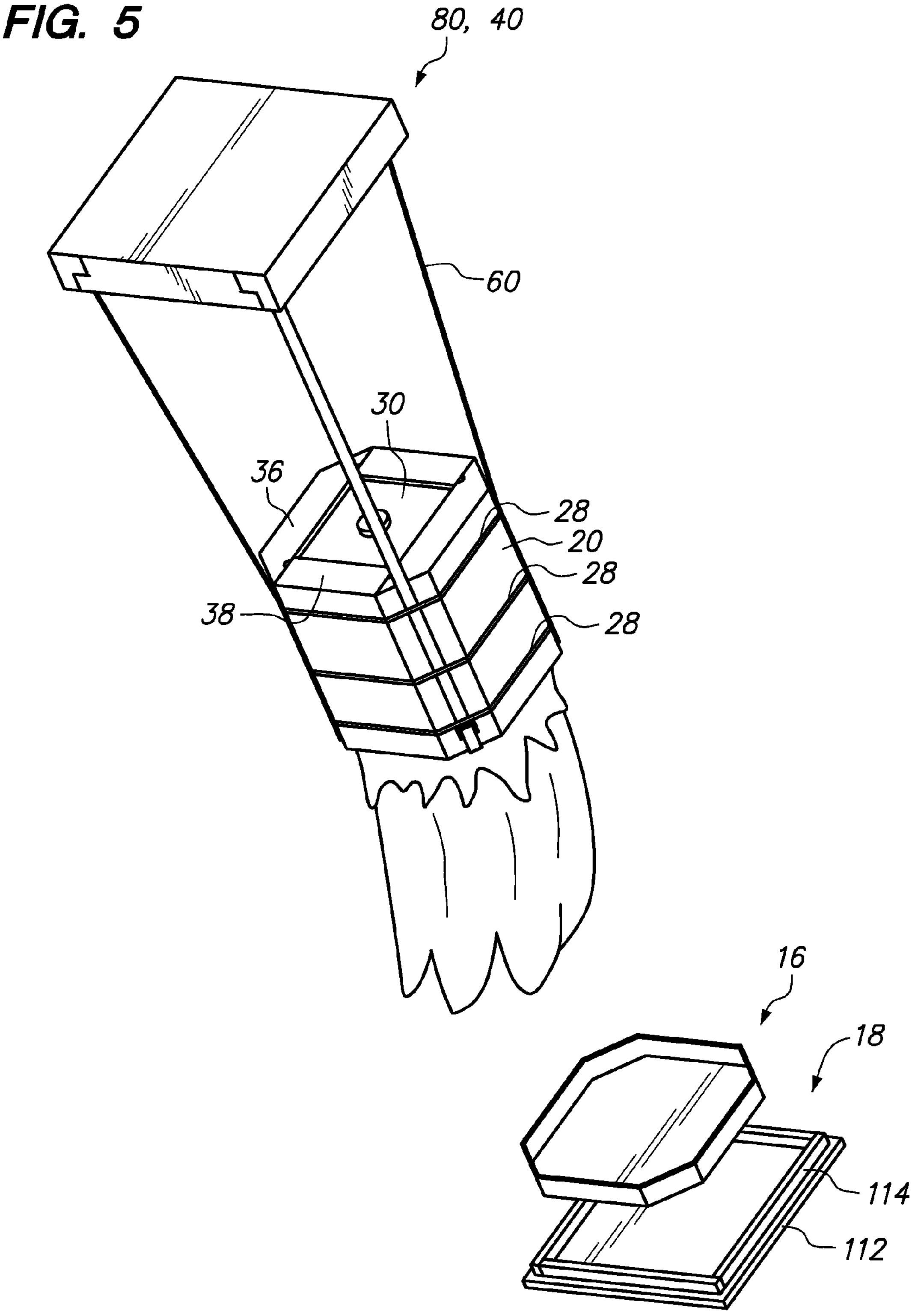
FIG. 5 is a perspective view of the aerial delivery system shown in FIG. 1 as the system is falling toward a target location.

The tray 16 may rest upon a skid 18 as shown in FIGS. 5 and 6. The skid 18 may be fabricated from a wood material. The skid 18 may have a flat bottom layer 112 as shown in FIG. 5. The flat bottom layer 112 may be a 1" thick single faced plywood with four 2" diameter radial cut corners. The flat bottom layer 112 extends or is large enough to support the entire tray 16 when in the folded configuration. One or more supporting or reinforcing rails 114 may be secured to the flat bottom 112 such as with polyvinyl acetate (PVA) glue and five #10 zinc, 2" long flat Phillips head wood screws which are countersunk approximately 1/16" deep from the top of the reinforcing rails 114. The reinforcing rails 114 may extend vertically upward from the flat bottom 112 and circumscribe the tray 16 when the tray 16 rests upon the flat bottom 112, as shown in FIG. 6. The rationale for the fasteners being countersunk from the top, rather than from the bottom is that prolonged periods of vibration during flight or standby on the ground could result in the dislodging (e.g., unscrewing) of the fastener, which may extend down into the path of aircraft roller system. This could create a snag and cause a hung load which results in an unsafe drop situation. The top position of the screw further provides for a clear visual inspection of the fastener condition during the unit assembly, fill, load and transit to the drop zone.

As the sleeve 20 and the tray 16 move during transport, the reinforcing rails 114 prevent the tray 16 from sliding off of the skid 18. The reinforcing rails 114 may each have the same dimensions to simplify manufacturing and assembly. The reinforcing rails 114 may be 1½"×1½" wood rails, each about 44" long. They 114 may be laid on the flat bottom 112 in a pinwheel or edge-to-side configuration. Nails, screws or other mechanical fastening devices (e.g., wood screws) may puncture the tops of the reinforcing walls 114 and engage the flat bottom 112. In this manner, if the mechanical fastening device is loosened, a quick visual inspection can reveal such defect. Also, this maintains a smooth under surface of the flat bottom 112 so that the system 10 as it is slid across the floor does not snag any discontinuities in the ground or support surface. The skid 18 can include slots and/or other features that facilitate the moving and general handling of the systems 10 (e.g., lifting the systems 10, loading them onto an aircraft, etc.).

One or more portions of the tray 16, the sleeve 20, the lid assembly 40, the cover and/or any other component of an aerial delivery system 10 can comprise cellulose-based materials (e.g., wood pulp, straw, cotton, bagasse, other paper or wood based materials, etc.). Cellulose-based materials can be provided in one or more forms, such as, for instance, containerboard or corrugated containerboard. Other forms of such materials can include single wall, double wall, triple wall or other corrugated containerboard materials. Depending on the desired design goals of a system, the cellulose-based materials may have more walls than a triple wall material, such as, four, five or more walls.

The single wall corrugated material may be 40 ETC (edge crush test) grade "C" flute. "C" flute has a nominal caliper width of 168-175 mil or 0.168-0.175 inches. The edge crush test measures compression strength in units per square inch of corrugating material. There are three parameters that specify the strength of each grade of corrugated board, namely, flute height in mils, number of flutes per inch and fluting draw factor. The height of "C" flute material is 188 mil. Nominally, it has 3.25 flutes per inch of board length and has a draw factor of 1.44. For every inch of "C" flute liner paper, there is 1.44 inches of medium paper. "C" flute single wall was selected for its combined rigidity and tear strength to weight ratio. This is due to the increased bias weight to both the liner papers (nominally one 69 lbs and one 42 lbs Kraft equivalents) and the medium paper (nominally one 33 lb medium) over prior art designs. The corrugated board may be fully biodegradable, recyclable and laminated using a corn starch based adhesive. Craft paper is preferred because of its biodegradable nature. The single wall corrugations may be used to fabricate the tray 16.

The triple wall corrugated material may consist of two different "ACA" flute board grades designed for specific strength characteristics. In addition to the "C" flute, the "A" flute walls have a nominal caliper width of 530-550 mil. Each layer of "C" flute board is laminated between two layers of "A" flute board. The height of "A" flute board is 230 mil. It has 2.75 flutes per inch and a draw factor of 1.55. The "A" flute board is used because it contains 18% more glue lines per inch than the "C" flute board and, hence, is stronger. "ACA" flute board was selected because of the different fluting configurations between "A" and "C" flute material. There is a low probability of flutes from the three walls aligning to cause a side wall failure. This results in improvement in the overall bulge and compression performance of the material. Lastly, there is a weight reduction in the center ply of the board. The "ACA" flute corrugated board materials are also biodegradable, recyclable and laminated with a corn starch based adhesive. A 1300 grade corrugated board is rated at 155 ECT and consists of two 90 lb outer liner papers, two 42 lb inner liner papers and three 36 lb medium papers. The 1300 grade board material improves bulge and compression tests. A 1500 grade corrugated board is rated at 190 ECT and consists of four 90 lb liner papers and three 36 lb medium papers. The triple wall corrugation may be used to fabricate the sleeve 20 and the layers 42, 44.

The various components of the system 10 such as the cap 80, lid assembly 20, sleeve 20 and tray 16 may be fabricated from the singlewall, double wall or triple wall corrugated material based on the expected functional strength and operational performance.

In other embodiments, one or more components of an aerial delivery system 10 can include one or more other materials, either in lieu of or in addition to cellulose-based materials, including plastics, rubbers or other composites, other natural or synthetic materials and/or the like.

According to some arrangements, the materials used in the construction of the various components of the aerial delivery system 10 can be biodegradable or otherwise configured to break-down or degrade over time. For example, in some embodiments, as discussed in greater detail herein, the bag 30 or other container configured to receive water, chemicals and/or the like can be adapted to break down as result of exposure to UV light, oxygen, biota and/or the like. Consequently, at least some embodiments of an aerial delivery system 10 can generally be environmentally-friendly, ensuring that the debris left behind after such systems are aerially deployed do not persist on or near the targeted location (e.g., forested areas, residential developments, other ground locations, lakes, oceans or other water bodies, etc.) for extended time periods.

Figure 3:
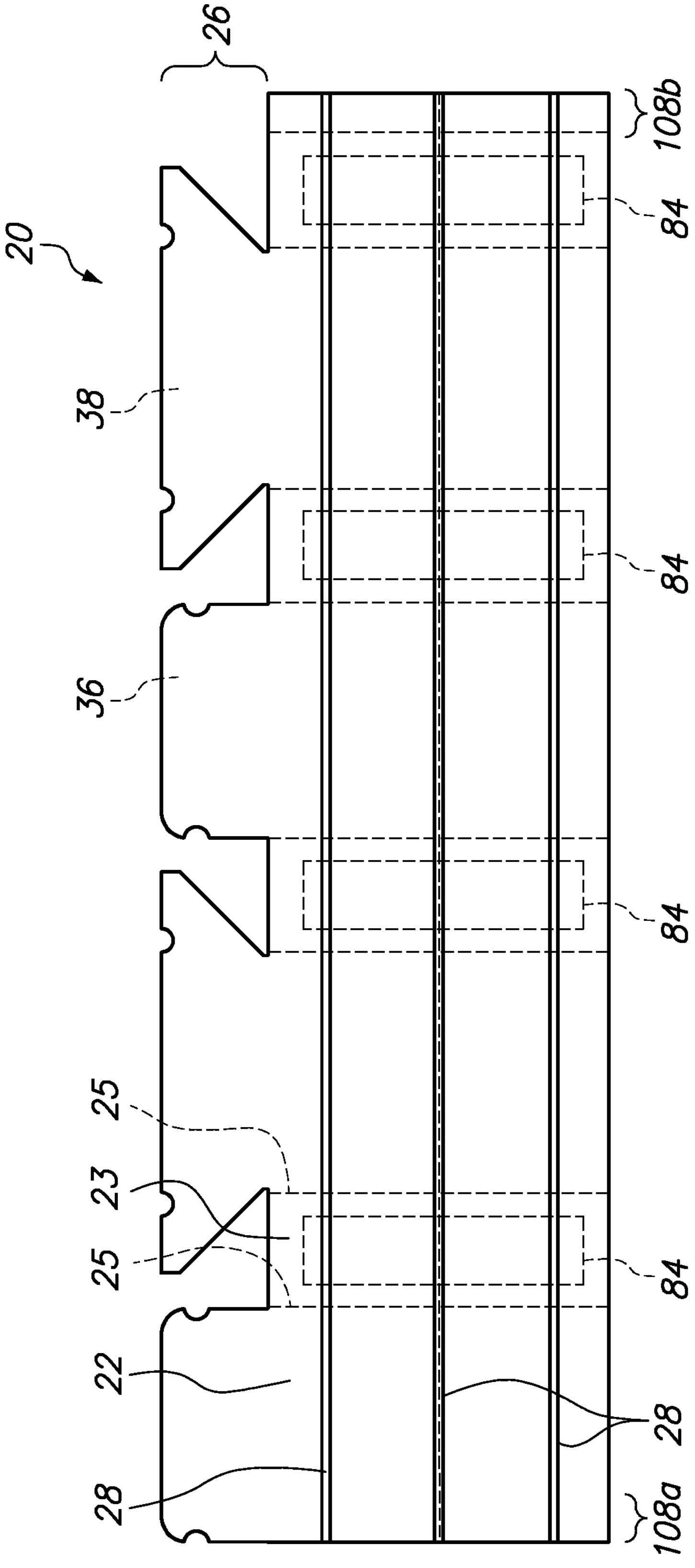
FIG. 3 illustrates a side view of an unassembled sleeve or sidewall portion configured for use with the aerial delivery system of FIG. 1 according to one embodiment.

FIG. 3 illustrates one embodiment of a sleeve 20 or other sidewall portion configured to be used in an aerial delivery system 10. The depicted embodiment is shown in an unassembled state (e.g., not formed into an octagonal or other enclosure design that is ready to be positioned on a pallet or other base). In FIG. 3, score lines 25 along which the cellulose-based materials (e.g., triple-wall corrugated containerboard) and/or other materials can be folded are shown, thereby forming the various walls or panels 22, 23 of the sleeve 20, the end portions 108*a, b* may be attached to each other through adhesive, staples, etc. Reinforcing bands 28 may be attached to the sleeve 20. To this end, the sleeve 20 is assembled by attaching the end portions 108*a* and 108*b* together. The bands 28 may be fabricated from an elongate continuous circular fibrous material and laminated onto the exterior of the sleeve 20. The bands 28 improve the hoop strength of the sleeve 20 and generally reinforce the system 10. One or more bands 28 can be selectively placed along the circumference of the sleeve 20. According to some embodiments, such reinforcing bands 28 comprise polypropylene, another thermoplastic, metals, composites and/or any other material. It is contemplated that the bands 28 may be incorporated into any of the sleeves 20 and tote 170 discussed herein.

Figure 4B:
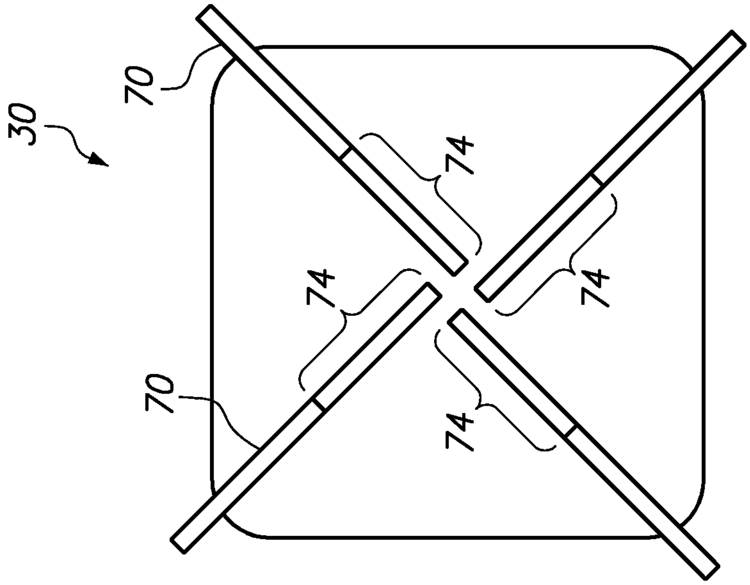
FIG. 4B illustrates a bottom view of the bag or other container configured for use with the aerial delivery system of FIG. 1.
Figure 4A:
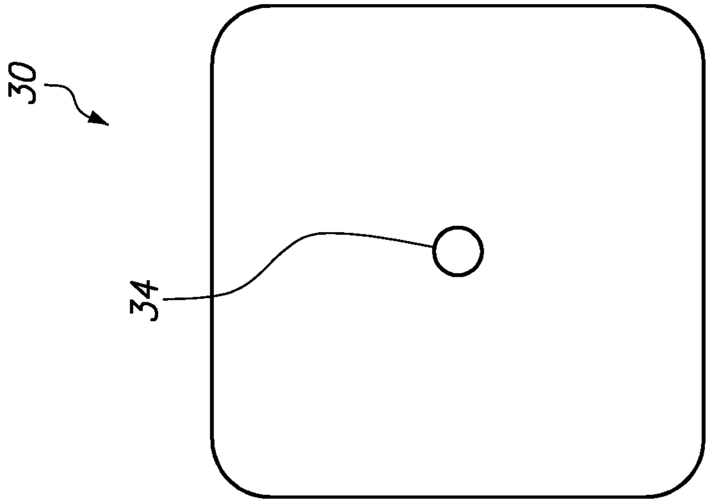
FIG. 4A illustrates a top view of a bag or other container configured for use with the aerial delivery system of FIG. 1.

Top and bottom views of one embodiment of a bag 30 or other container configured to receive water, chemicals and/or other substances are illustrated in FIGS. 4A and 4B. As discussed above and illustrated herein, the bag 30 can be sized, shaped and otherwise configured to fit within an interior space formed by the sidewall or sleeve 20 of the aerial delivery system 10. According to certain arrangements, the bag 10 may be fabricated from polyethylene (e.g., linear low-density polyethylene, LLDPE, film), other thermoplastics and/or any other material configured to retain water or other substance placed therein. In one embodiment, the LLDPE film has a thickness of approximately 6 mils. However, the thickness of the film or other material that comprises the bag 30 can be greater or less than 6 mils, as desired or required.

As illustrated in FIGS. 1 and 4A, the top of the bag 30 can include a port 34 (e.g., 2" female threaded filling gland) through which water, other liquids and/or other materials are directed during a filling procedure. In some embodiments, the bag 30 is filled once the various components of the aerial delivery system 10 (e.g., the tray 16, the sidewalls, etc.) have been properly assembled and prior to the lid assembly 40 and cap 80 being disposed on the sleeve 20. For instance, the systems 10 can be filled immediately prior to being loaded on an aircraft. Once the desired or required volume or other amount of water (e.g., 90% filled), other fluids and/or other materials have been placed within the bag 30 or other container, a cap or other enclosure 81 (shown in FIG. 1) can be used to close the port 34. The port 34 may receive a 2" cam lock fitment that is fitted on the end of a hose. Additionally, the lid assembly 40 and/or the cap 80 may be placed on top of the sleeve 20 after the bag 30 is filled.

With continued reference to FIG. 4B, one or more straps 70 can be directly or indirectly secured to the bag 30. In the illustrated embodiment, four straps 70 are attached to a bottom surface of the bag 30 using one or more connection methods or devices, such as, for example, heat welding, ultrasonic welding, adhesives, mechanical devices and/or the like. The straps 70 are attached to the bag 30 at 74. In other embodiments, the straps 70 can be attached to other portions of the bag 30 and/or other components of the system 10 (e.g., sleeve 20, tray 16, etc.), either in addition to or in lieu of being attached to the bottom of the bag 30. As depicted in FIG. 1, the straps 70 that are connected to the bag 30 can be separate from the straps 60 that are attached to the lid assembly 40 of an aerial delivery system 10. Thus, the various straps 60, 70 utilized in the system 10 can comprise loops 62, 72 or other connection devices or features that are adapted to be selectively attached to each other. However, in other arrangements, the same straps are used to connect the lid assembly 40 to the bag 30.

Accordingly, after the lid assembly 40 and/or the cap 80 is placed on top of the sleeve 20, the straps 60 hang down along side the sleeve 20. The straps 60 may be connected to the straps 70 by way of the loops 62, 72. The loops 62, 72 may be attached to each other by way of a zip tie 82 or other securement mechanism that will not break during deployment of the system 10.

The bag can comprise one or more additives (e.g., bio-additives, other agents, etc.) that help the bag 30 decompose or otherwise break down over time. Therefore, as with the cellulose-based materials discussed above, the debris left behind after an aerial delivery system 10 has been deployed (e.g., dropped from an aircraft) can be advantageously configured to be environmentally friendly. In some embodiments, the bag 30 is configured to slowly or rapidly decompose in the presence of oxygen (or other gasses), sunlight (e.g., UV radiation), biota (e.g., bacteria or other microorganisms found in vegetation, soil, fresh water, saltwater, etc.) and/or any other material or environment.

In addition, the bag 30 or other container can be designed to tear, rip or otherwise be compromised so as to release the contents contained therein upon the occurrence of a specific event. For example, in some embodiments, the bag 30 is configured to tear when the straps 70 attached to the bag 30 are subjected to tension (e.g., when the lid assembly 40 of the aerial delivery system 10 experiences deceleration forces relative to the bag 30 following its deployment from an aircraft). In some embodiments, the bag 30 comprises scoring, perforations or other weakened portions along which it is intended to tear. However, in other arrangements, the bag 30 can be adapted to tear, rip, puncture or otherwise become compromised without the assistance of such features.

In some embodiments, one, two or more aerial delivery systems 10 are filled (e.g., with water, chemicals, etc.) and loaded onto an aircraft. Once the aircraft is in a desired spatial location (e.g., above a fire, contaminated area or other target area, at or near a desired elevation, etc.), such systems 10 can be dropped from the aircraft. According to some embodiments, the trays 16 and skid 18 separate from the other components 20, 30 immediately or shortly after the systems 10 are deployed or dropped from the aircraft, as shown in FIG. 5. Further, the lid assembly 40 can move away from the sleeve 20 and bag 30, so as to provide a parachute effect to the system 10. The lift forces generated at the lid assembly 40 can reduce or eliminate any slack existing in the straps 60, 70. As discussed above, this can create shear and other forces along the strap-bag interface 74 (see FIG. 4B), causing the bag 30 to tear, rip or otherwise to become compromised. Consequently, the interior contents of the bag 30 (e.g., water, chemical retardants, etc.) can be released into the environment and effectively delivered to the fire, contaminated area or other target location. For example, the bag can include pesticides or other chemicals that are intended to treat a particular agricultural area.

Figure 7:
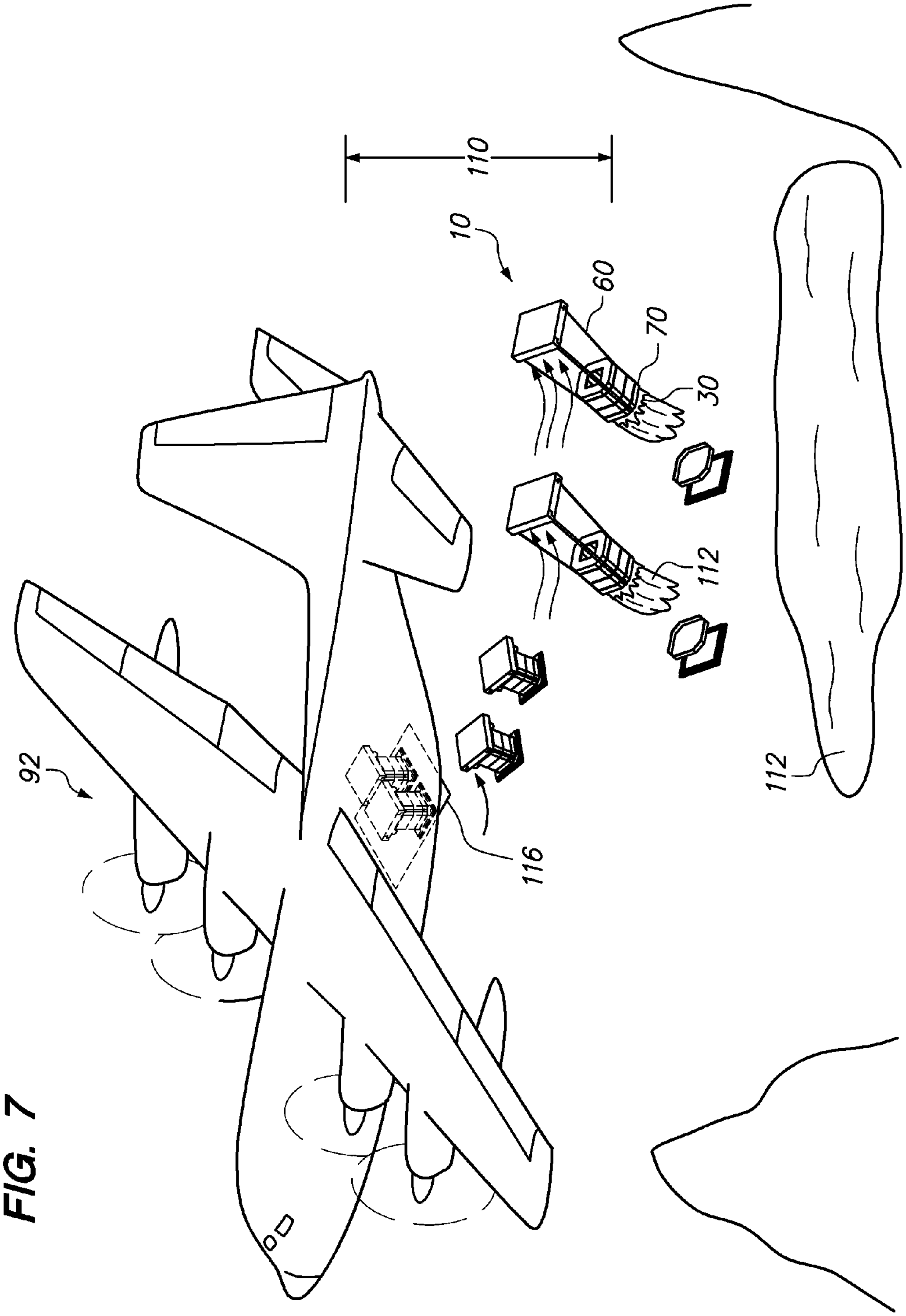
FIG. 7 illustrates an aircraft flying high above the ground as the system is deployed from the aircraft.

In some embodiments, the length and general configuration of the straps 60, 70 can advantageously permit a user to selectively control the elevation at which the interior contents of the bag 30 are released. Thus, such configurations can allow aircraft to drop aerial delivery systems 10 from a higher, safer elevation, while ensuring that the water, chemicals and/or other materials contained therein will not be released until a lower, desired level above the target area. By way of example and not limitation, the straps 60 may be rolled up 64 near the lid assembly 40, as shown in FIG. 6. During transport and up until deployment of the system from the aircraft, the straps 60 may be maintained in the rolled up configuration. However, when the system is dropped from the aircraft, the lid assembly 40 may be caught within the slipstream of the aircraft and provide an upward force to the lid assembly 40 that unravels the rolled up portion 64 of the straps 60, as shown in FIGS. 5 and 7. The system 10 may drop a significant distance 110 (see FIG. 7) below the aircraft 92 before tension is placed on the straps 60, 70 thereby rupturing the bag 30 and releasing its contents, as shown in FIG. 7.

According to some embodiments, the bag 30 of the system 10 is configured to contain approximately 100 to 500 gallons (e.g., 100, 150, 200, 220, 230, 250, 300, 350, 400, 450, 500 gallons, volumes between such values, etc.) of water, other fluids, gels, powders, solids and/or other materials. However, in other arrangements, the capacity of the bag 30 can be greater than 500 gallons or less than 100 gallons, as desired or required. In yet other embodiments, a single system can comprises two or more bags 30 positioned within a single sleeve 20. In some embodiments, the overall dimensions of an aerial delivery system 10 are approximately 4 feet wide, by 4 feet long, by 4 feet high. However, in other arrangements, one or more of the dimensions of the system 10 can be greater or less than 4 feet, as desired or required. Further, the weight of a filled or partially filled aerial delivery system 10 manufactured in accordance with the various features disclosed herein can be approximately 1000 to 3000 pounds (e.g., 1000, 1200, 1400, 1600, 1800, 2000, 2200, 2400, 2600, 2800, 3000 pounds, weights between such values, etc.). However, the approximate weight of a system 10 can be less than 1000 pounds or greater than 3000 pounds, as desired or required.

Referring back to FIG. 3, the sleeve 20 may also be formed with a locking top 26. The locking top 26 may comprise first and second tabs 36, 38 which may be 11" tall and may interlock with each other when the sleeve 20 is erected as shown in FIG. 5. The locking top improves set up and handling of the system 10 in both the empty and filled states. The locking top 26 along with the reinforced bands 28 help to mitigate bulging of the sleeve 20 due to the weight of the active filler material (e.g., fire retardant, water, oil absorbent, etc.) filled within the bag 30. The locking top 26 facilitates a more rigid sleeve 20 and forms the outer configuration (e.g., octagonal) of the sleeve 20 prior to placement of the sleeve 20 onto the tray 16.

When the reinforced bands 28 are attached to the exterior surface of the sleeve 20, portion 84 (see FIG. 3) of the reinforced bands 28 may be unattached to the exterior surface of the sleeve 20. This allows the strap 60 as shown in FIG. 6 to be fed under the bands 28. The strap 60 may be rolled up 64 and tucked under the bands 28 at portions 84 so that the strap 60 does not interfere or get caught in material handling procedures and machinery as the aerial delivery system 10 is being transported to the aircraft 92 and when the aerial delivery system 10 is being dropped from the aircraft 92, as shown in FIG. 7. As shown in FIG. 5, when the aerial delivery system 10 is dropped from the aircraft, the lid assembly 40 and cap 80 decelerates thereby placing tension on the strap 60 unraveling the rolled up portion 64. This pulls the strap 60 up through and under the reinforced bands 28. The pull through of the strap 60 also dislodges the tray 16 and skid 18 from the sleeve 20. Since the strap 60 is fed through or under the bands 28, the unraveling of the band 28 is in an orderly manner and such configuration mitigates tangling of the strap as the bag 30 and sleeve 20 accelerate away from the cap 80 and lid assembly 40.

Figure 8:
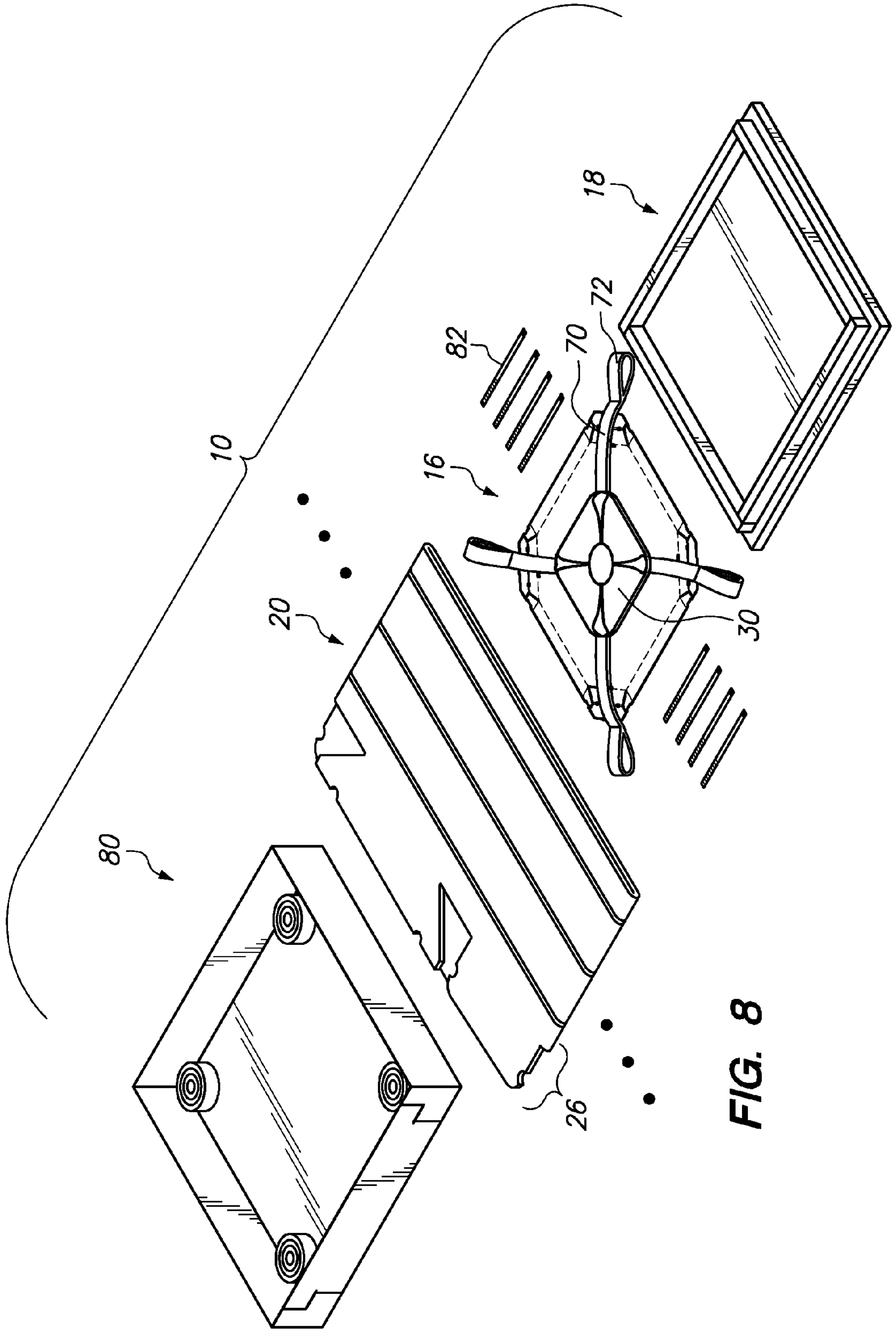
FIG. 8 is a perspective view of the system shown in FIG. 1 prior to assembly.
Figure 9:
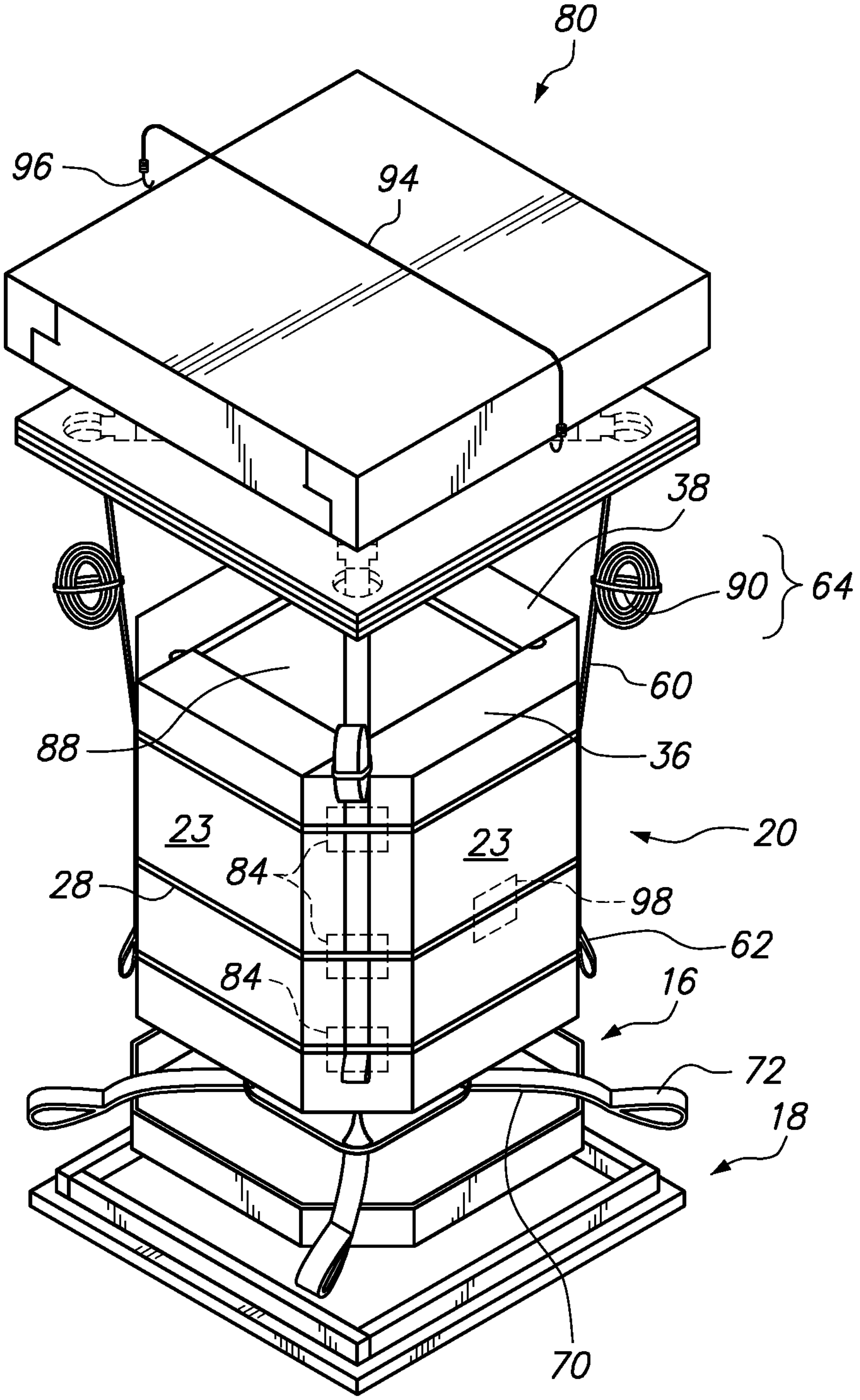
FIG. 9 is an exploded view of the system shown in FIG. 6.

Referring now to FIG. 8, a process for assembling the aerial delivery system 10 is shown. Initially, the tray 16, skid 18, sleeve 20 and cap 80 including lid assembly 40 are lined up on the ground. The tray 16 may have a bag 30 laid thereon with straps 70 that extend outward symmetrically in four different directions. The straps 70 are preferably attached to or welded to the bottom of the bag 30 as shown in FIG. 4B. The straps 70 may be welded to the bottom of the bag 30 in a pinwheel fashion. When the straps 60 and 70 are placed into tension, the straps 70 spin the bag 30 and enable more efficient tearing of the bag 30 at the connection points. The straps 70 may have loops 72. When the tray 16 is erected as shown in FIG. 2A, the loops 72 of the straps 70 are sufficiently long so that the loops 72 are still accessible after the sleeve 20 is mounted on the tray 16, as shown in FIG. 9. The sleeve 20 is then erected into an octagonal shape and the locking top 26 is assembled. In particular, the score lines 25 of the sleeve 20 may be folded first. The second tabs 38 may be folded in first. The first tabs 36 may then be folded in until the locking cut outs are engaged to each other. The user may then pull up firmly on the inside edge of all four tabs 36, 38 to secure the locking top 26. The first and second tabs 36, 38 of the locking top 26 form an opening 88 which is used to fill the bag 30 with the filler material (e.g., liquid, viscous, solid, particulate, etc.). Before the filler material is filled into the bag 30, the sleeve 20 and the tray 16 are engaged and laid on top of the skid 18.

The bag 30 may have a port 34 which may be connected to a hose that flows filler material (e.g., fire retardant, water, viscous, solid material, liquid material, etc.) through the hose and into the bag 30 through the port 34. As the bag 30 is filled with filler material, the weight of the filler material begins to push outward on the panels 23 of the sleeve 20. The heavy duty construction of the panels 23, reinforcement bands 28 and the locking top 26 mitigate excessive bulging of the panels 23. Also, as the bag 30 is being filled, the hose is adjusted upwards allowing for movement of the bag. After the bag 30 is filled with filler material (e.g., 90% of bag volume), the port 34 is closed with a plug to prevent spillage of the filler material. Also, the locking top 26 facilitates retainment of the bag 30 in the sleeve 20 during flight that might cause a vertical "G" force environment.

The cap 80 including lid assembly 40 is now placed over the sleeve 20. While the cap 80 is still laid on the ground as shown in FIG. 8, the strap 60 is measured so that the hook 62 reaches the hook 72 of the strap 70 after the cap 80 is placed over the sleeve 20. The rolled up portion 64 of the strap 60 may be tied with a breakable band 90. The purpose of tying the rolled up portion 64 with the breakable band 90 is to provide a compact configuration so that the strap 60 does not interfere with movement of the system 10 when loaded onto the aircraft 92 or during the process of dropping the system 10 from the aircraft 92. The straps 60 are now fed under the reinforcement bands 28 at the portions 84 which are not attached to the exterior surface of the sleeve 20. The loops 62 extend preferably below the lowermost reinforcement band 28.

The outer periphery of the cap 80 is significantly larger than the outer periphery of the sleeve 20. Accordingly, the cap 80 overhangs the outer periphery of the sleeve 20 so that the cap 80 and the lid assembly 40 may catch the draft of air as the system 10 is dropped from the aircraft 92. To ensure that the cap 80 remains on top of the sleeve 20, bungee cords 94 may be wrapped over the cap 80 and hooked onto the sleeve 20. For example, the hook 96 of the bungee cord 94 may be hooked onto the reinforcement band 28. To this end, the reinforcement band 28 is not attached to the exterior surface of the sleeve 20 at the desired location. By way of example and not limitation, portion 98 of the reinforcement band 28 may be left unattached to the sleeve 20. This allows the hook 96 of the bungee cord 94 to hook onto the reinforcement band 28 at the location of the portion 98. During transport of the system 10 to the aircraft as well as during erratic movement of the aircraft in flight, the bungee cord 94 retains the cap 80 on the sleeve 20.

Just prior to dropping the system 10 to the desired location from the aircraft 92, the system 10 may be armed. In particular, the loops 62 of straps 60 may be permanently attached to the loops 72 of straps 70. If the loops 62 and 72 are not attached to each other, when the system 10 is dropped from the aircraft 92, the straps 60 will slip out from under the reinforcement band 28 and not rupture the bag 30 to disperse the filler material onto the desired location. The bungee cords 94 may also be removed. With the loops 62 and 72 permanently attached and the bungee cord removed, when the system 10 is deployed from the aircraft 92, as shown in FIG. 7, the cap 80/lid assembly 40 catches the wind due to the overhang of the cap 80 in relation to the sleeve 20. The cap 80/lid assembly 40 decelerates while the sleeve 20 and the bag 30 accelerate toward the ground. The breakable band 90 allow the strap 60 to extend further and prevent tension on the strap 60 and strap 70 for a significant period of time to allow the bag 30 to drop closer to the ground without breakage. After a certain period of time or after the bag 30 has traveled a certain distance, the strap 60 is now placed in tension due to the parachute effect of the cap 80 and acceleration of the bag 30 toward the ground. At this time, the straps 70 tear the bag 30 apart. The pinwheel attachment of the straps 70 to the bag 30 facilitate and encourage such rupture. At this point, the bag 30 has traveled a significant distance 110 so that the dispersion of the filler material 112 reaches the target location with sufficient concentration or potency.

Figure 10:
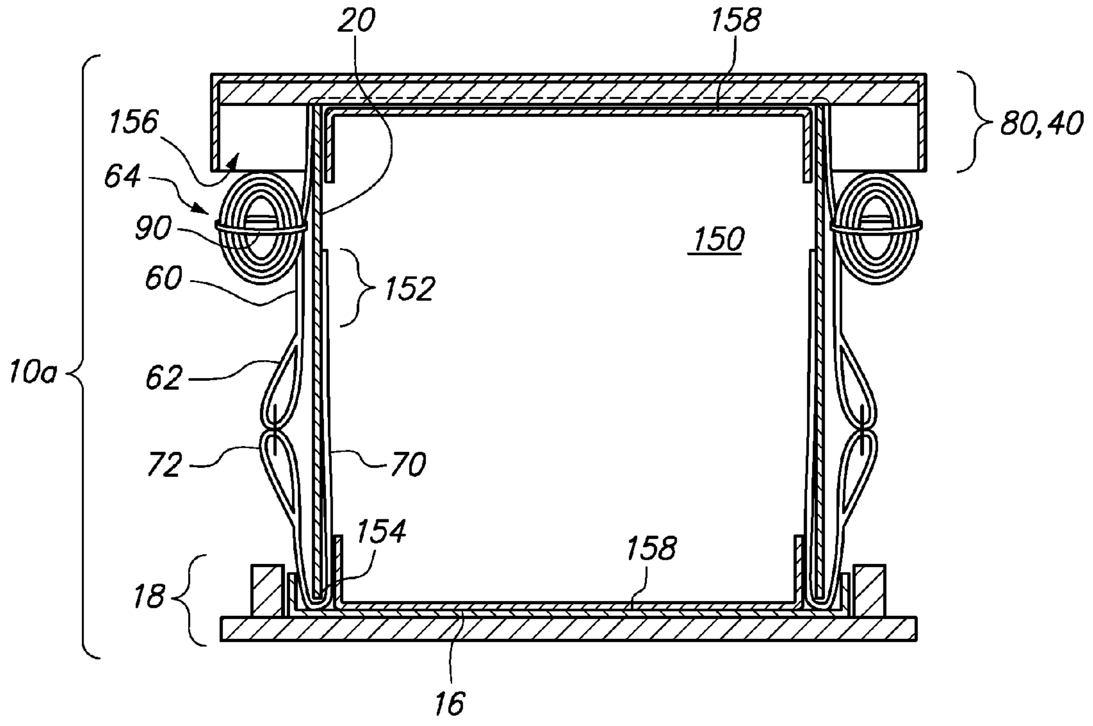
FIG. 10 is a second embodiment of the aerial delivery system.

Referring now to FIG. 10, a second embodiment of the aerial delivery system 10*a* is shown. The aerial delivery system 10*a* does not incorporate a bag 30. Rather, the sleeve 20, tray 16 and the cap 80/lid assembly 40 retain the filler material within a cavity 150 there within. The straps 60 may be attached to the lid assembly 40 and cap 80 as discussed above in relation to the first embodiment of the aerial delivery system 10. However, the straps 70 may be attached to an interior surface of the sleeve 20 as shown in FIG. 10. Preferably, the distal end portion 152 is permanently attached to the interior surface of the sleeve 20. Moreover, the distal end portion 152 of the straps 70 is attached to the upper half of the sleeve 20. The straps 70 may be routed below the lower edge 154 of the sleeve 20 with the loops 72 accessible from the outside when the tray 16 is fitted around the sleeve 20 similar to the aerial delivery system 10 discussed above. The tray 16 and sleeve 20 may be disposed upon skid 18.

To fill the aerial delivery system 10*a* with filler material, the tray 16 may be disposed upon the skid 18. The sleeve 20 may be erected and then placed on the tray 16 with the loops 72 protruding outside of the sleeve 20 so as to be accessible when arming the aerial delivery system 10*a* prior to deployment. The cap 80 and lid assembly 40 are not disposed on the sleeve 20 at this time. The filler material is inserted into the cavity 150. After the filler material is inserted into the cavity 150, the cap 80 and lid assembly 40 are placed on the sleeve 20 to close the top of the sleeve 20. Bungee cords may be used to secure the cap 80 and lid assembly 40 to the sleeve 20 by way of forming openings or hook receptacles on the sleeve 20 or other parts of the aerial delivery system 10*a*.

Prior to dropping the aerial delivery system 10*a* from an aircraft 92, the aerial delivery system 10*a* may be armed. In particular, the hooks 62 of the strap 60 are permanently attached to the hooks 72 of the strap 70 such as with zip ties. The bungee cords holding the cap 80 and lid assembly 40 to the sleeve 20 are removed. The aerial delivery system 10*a* is dropped from an aircraft 92. At this time, the wind catches the overhang 156 of the cap 80 and lid assembly 40 to blow the lid assembly 40 off of the sleeve 20. Breakable bands 90 are broken to unravel the rolled up portion 64 of the strap 60 to allow the material within the cavity 150 to drop significantly below the aircraft 92 prior to dispersement of the filler material. After the aerial delivery system 10*a* has significantly dropped below the aircraft 92, the straps 60 are placed in tension and begin to tear the bottom edge 154 of the sleeve 20. The tension in the straps 60 break apart the sleeve 20 to disperse the filler material within the cavity 150. To maintain or retain the filler material within the cavity 150 when the aerial delivery system 10*a* is dropped from the aircraft 92, flexible covers 158 may be tucked on top and below the filler material in the cavity 150. The weight of the filler material presses against the outer peripheral portion of the flexible covers 158. When the aerial delivery system 10*a* is dropped from the aircraft 92, the lid assembly 40 and cap 80 as well as the tray 16 and skid 18 tend to fall apart from the sleeve 20. The flexible covers 158 help retain the filler maintain within the cavity 150.

Figure 11:
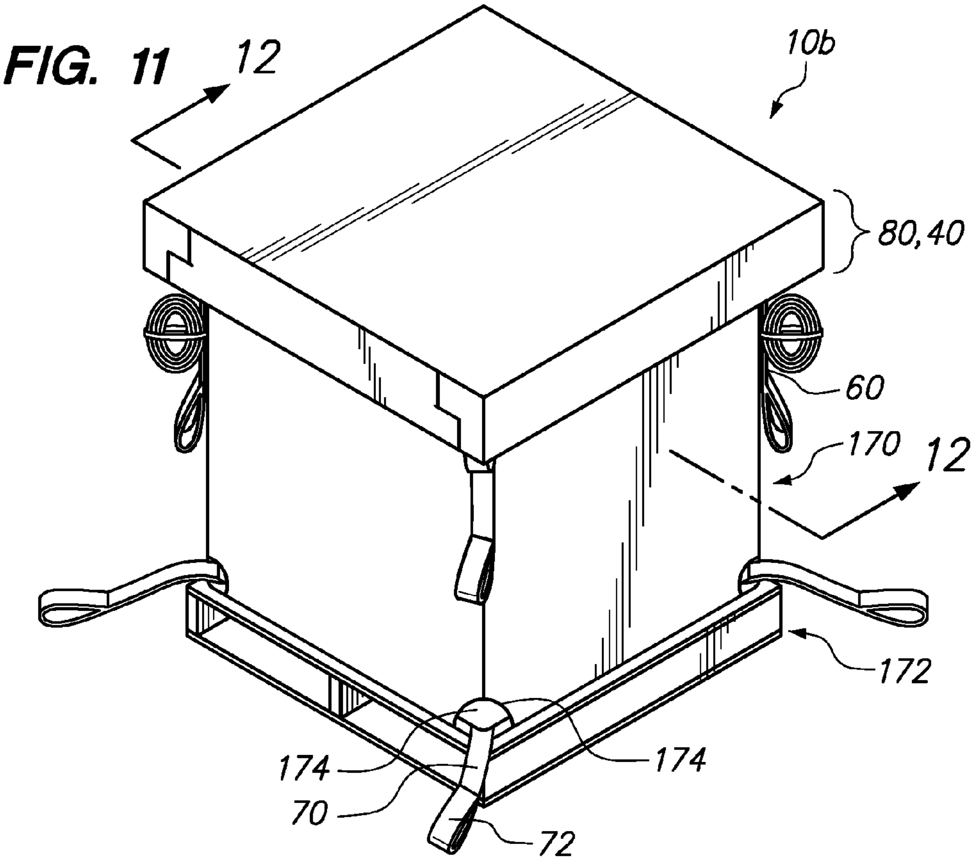
FIG. 11 is a third embodiment of the aerial delivery system.
Figure 12:
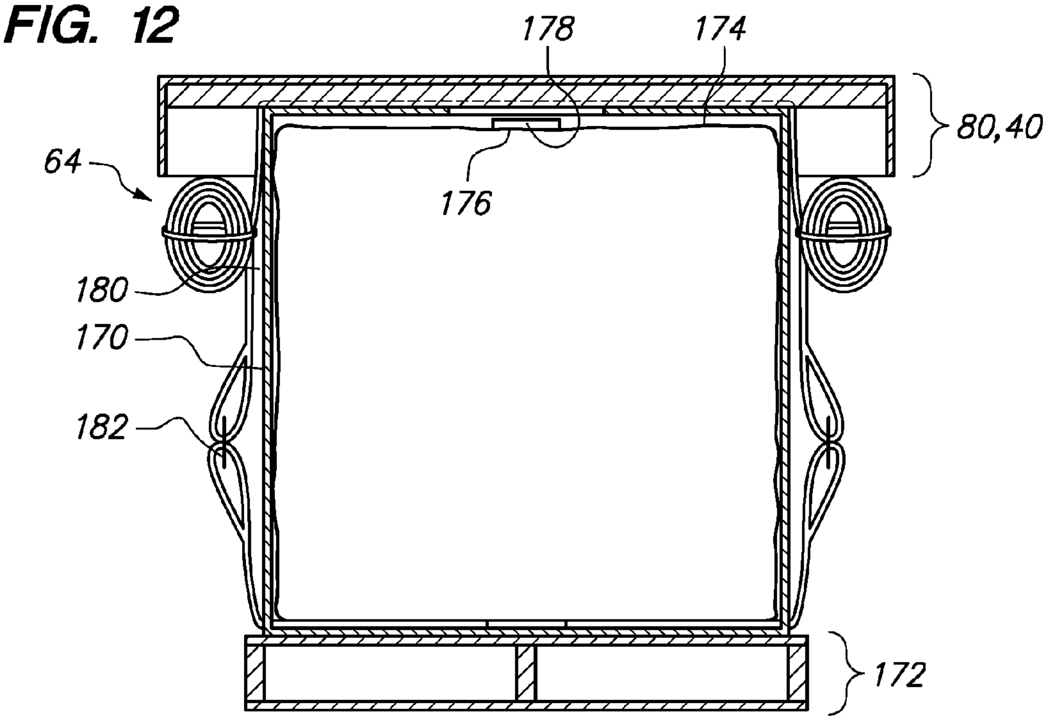
FIG. 12 is a cross sectional view of the aerial delivery system shown in FIG. 11.

Referring now to FIG. 11, a third embodiment of the aerial delivery system 10*b* is shown. The aerial delivery system 10*b* may include a cap 80 and lid assembly 40 with straps 60 attached thereto. Instead of a sleeve 20, a tote 170 may be provided. The tote 170 may be placed upon a pallet 172. The tote 170 may have a closed bottom and a closable top. Any means of closing the bottom and top known in the art are contemplated. Bag 174 may be placed inside of the tote 170. When doing so, straps 70 which are attached to the bottom of the bag 174 as shown in FIG. 4B, are routed through openings 174 formed at one or more locations around the tote 170 so that loops 72 of the straps 70 are accessible from the outside. Preferably, the openings 174 are symmetrical about the tote 170. A hose for filling the bag 174 may be attached to a port 176. After the bag 174 is filled, the hose is removed and a cap 178 closes the port 176. The top of the tote 170 is closed. The lid assembly 40 and cap 80 are placed over the tote 170. Preferably, the lid assembly 40 and the cap 80 overhang 180 the outer periphery of the tote 170. To arm the system 10*b*, zip ties 182 may be used to secure the loops 62 to the loops 72 of the straps 60, 70. Upon deployment, the wind catches the overhang 180 and moves the lid assembly 40 and cap 80 away from the tote 170. The rolled up portion 64 unravels to allow the tote 170 to drop further closer to the ground and away from the aircraft 92. When the tote 170 has dropped a significant distance below the aircraft 92, the lid assembly 40 and cap 80 place tension on the straps 60 which transfers tension on the straps 70 attached to the bottom side of the bag 174. The fluid within the bag 174 is released and weight of the fluid ruptures the tote 170. The filler material is then dispersed at the target location.

Figure 13:
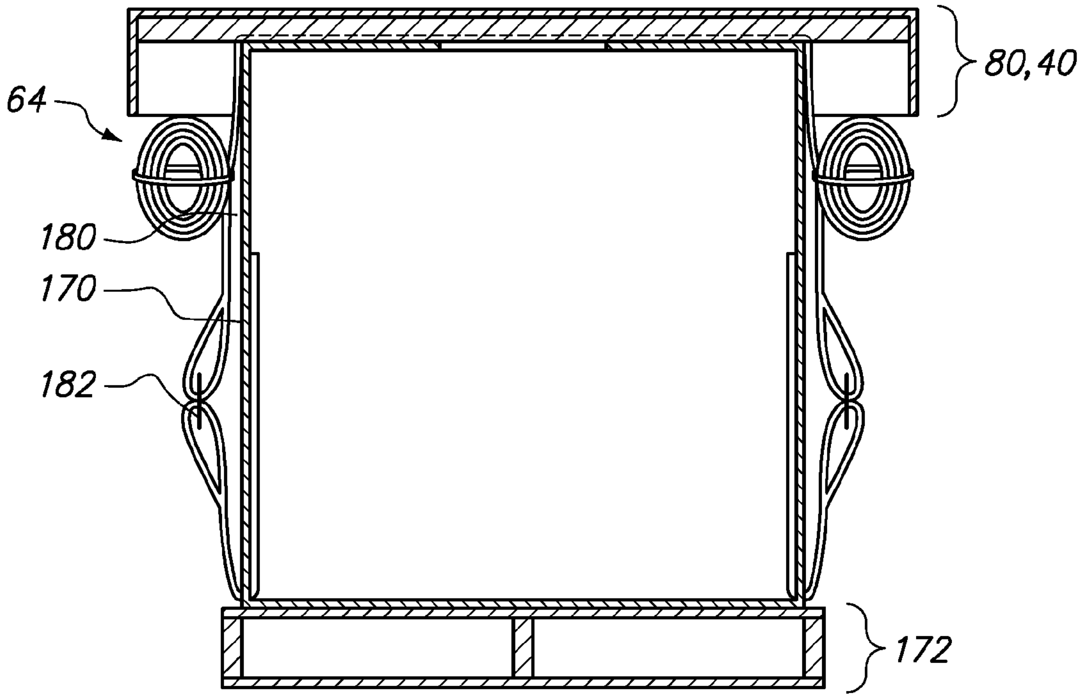
FIG. 13 is a fourth embodiment of the aerial delivery system.

Referring now to FIG. 13, a fourth embodiment of the aerial delivery system 10*c* is shown. In particular, the fourth embodiment of the aerial delivery system 10*c* is the same as the third embodiment of the aerial delivery system 10*b* except that there is no bag 174 and the distal end portion 152 of the straps 70 may be attached to the upper half of the tote 170 similar to the system 10*a* shown in FIG. 10. Upon dropping the aerial delivery system 10*c* from the aircraft 92, the straps 70 rip the bottom of the tote 170 to break apart the tote 170 and disperse the filler material contained within the tote 170.

Figure 14:
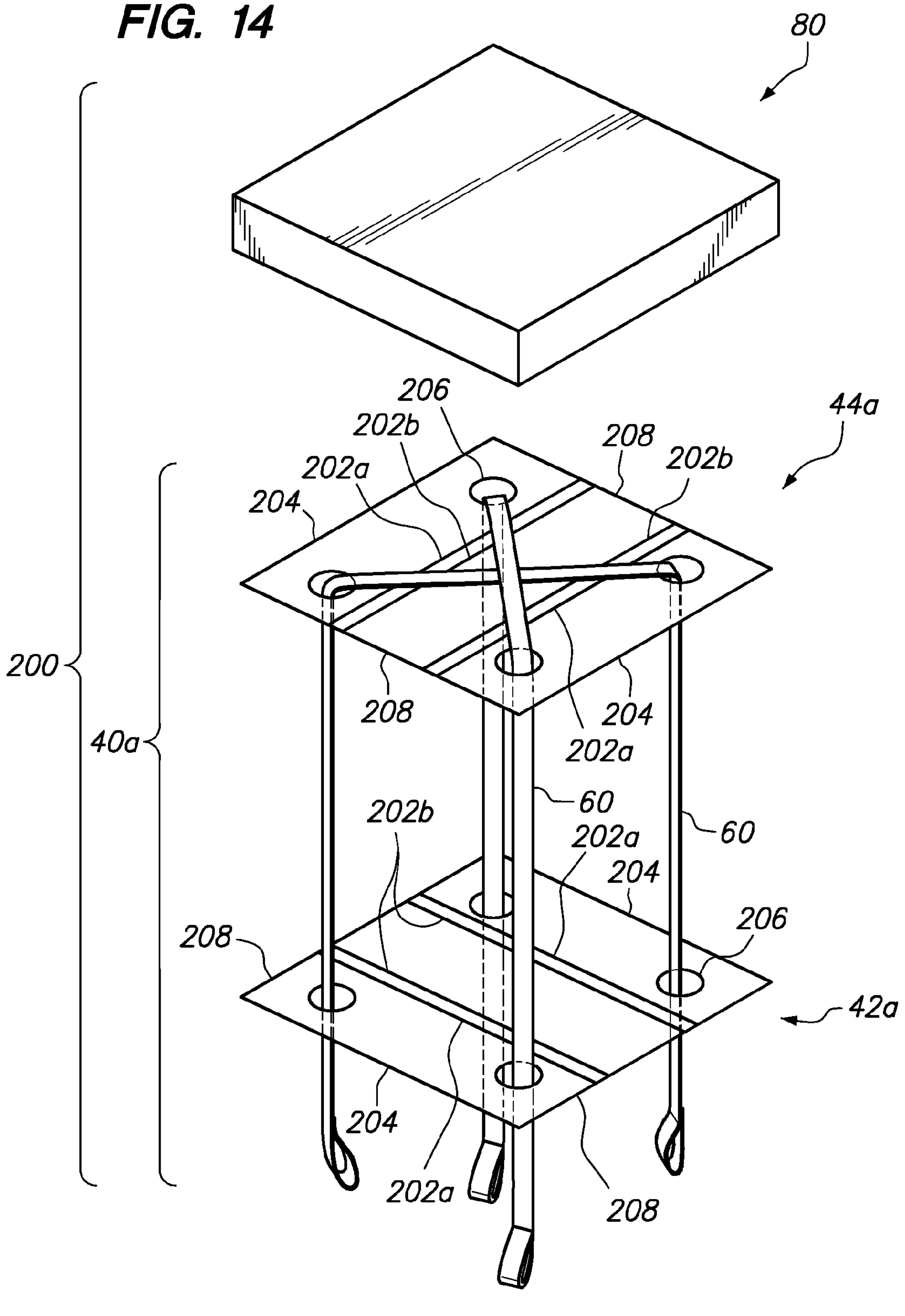
FIG. 14 is an alternate embodiment of a lid assembly.
Figure 15:
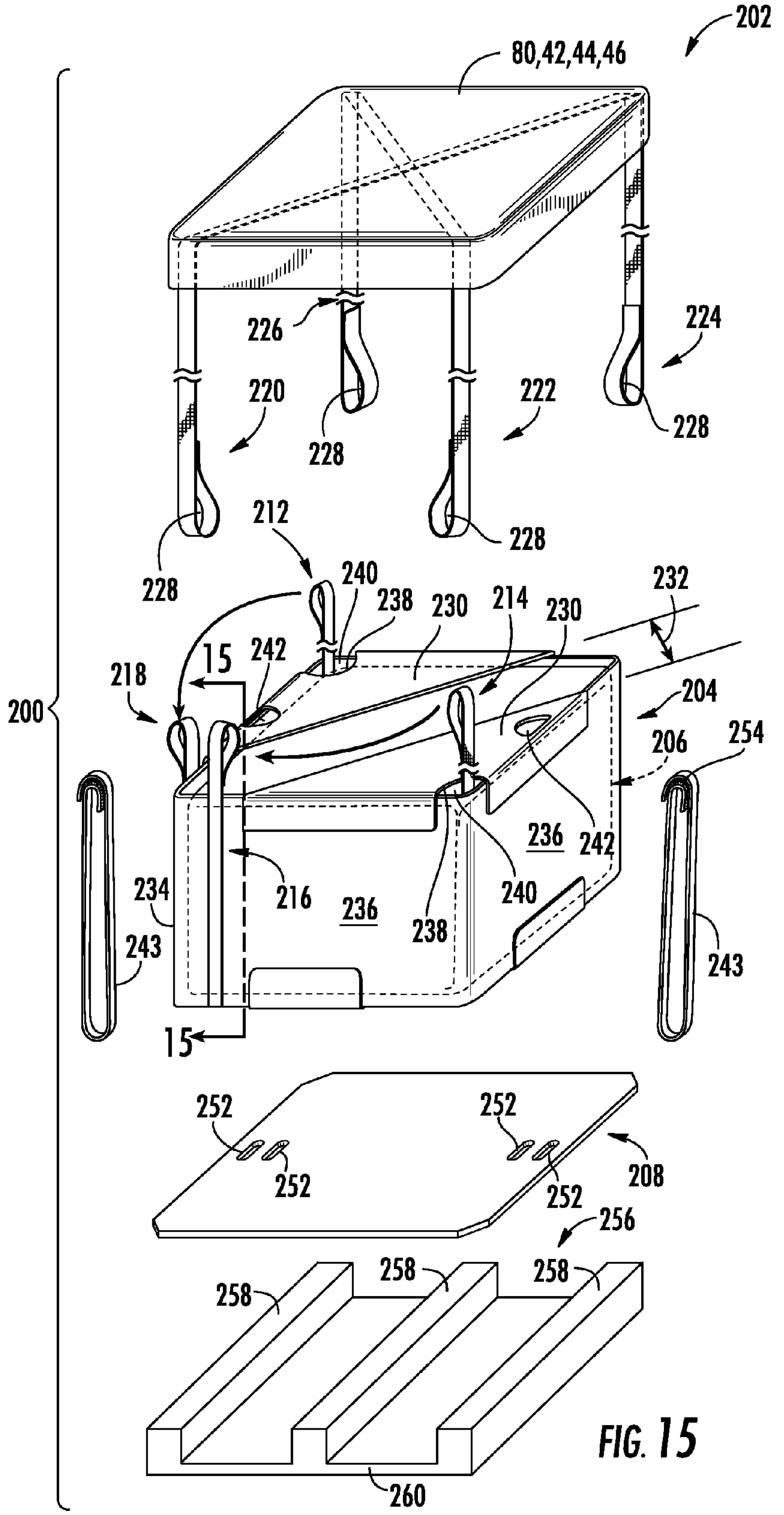
FIG. 15 is a perspective view of another embodiment of the aerial delivery system.

Referring now to FIG. 14, a cap assembly 200 is shown. The cap assembly 200 may include the cap 80 shown and described above. The cap assembly 200 may also include layers 42*a*, 44*a*. Each of the layers 42*a*, 44*a* may be fabricated from a 1300 grade triple wall sheet measuring 47"×47". Each of the layers 42*a*, 44*a* may have four reinforcement tapes 202*a, b* (e.g., sesame tapes) incorporated into the layers 42*a*, 44*a*. The reinforcement tapes 202*a* may be located approximately 6" from an edge 204 of the layers 42*a*, 44*a*. Reinforcement tapes 202*b* may be located about 9" away from the edge 204 of the layers 42*a*, 44*a*. The layers 42*a*, 44*a* may be set so that the reinforcement tapes 202*a, b* on one of the layers 42*a*, 44*a* are orthogonal to the reinforcement tapes 202*a, b* of one of the other layers 42*a*, 44*a* as shown in FIG. 15. The layers 42*a*, 44*a* may be laminated to each other or attached to each other using a cold set PVA glue to form the lid assembly 40*a*. Holes 206 may be formed in each of the layers 42*a*, 44*a* in four places. The holes 206 may be about 2" in diameter and its edge located about 3" away from the edge 204, 208 of the layers 42*a*, 44*a*. Straps 60 may be fed through the holes 206 and form a criss-cross pattern. The lid assembly 40*a* may now be attached to the underside of the cap 80 by way of adhesive, or other attachment methods known in the art or developed in the future. The cap assembly 200 may replace the cap 80 and lid assembly 40 discussed above in the other embodiments of the aerial delivery system 10*a*-10*d*. The reinforcement tapes 202*a, b* prevent the straps 60 from slicing through the layers 42*a*, 44*a* during deployment. The straps 60 place an enormous amount of stress on the lid assembly 40*a* in order to rip the sleeve 20 or the bag 30, 174.

The systems, apparatuses, devices and/or other articles disclosed herein may be formed through any suitable means. The various methods and techniques described above provide a number of ways to carry out the inventions. Of course, it is to be understood that not necessarily all objectives or advantages described may be achieved in accordance with any particular embodiment described herein. Thus, for example, those skilled in the art will recognize that the methods may be performed in a manner that achieves or optimizes one advantage or group of advantages as taught herein without necessarily achieving other objectives or advantages as may be taught or suggested herein.

Furthermore, the skilled artisan will recognize the interchangeability of various features from different embodiments disclosed herein. Similarly, the various features and steps discussed above, as well as other known equivalents for each such feature or step, can be mixed and matched by one of ordinary skill in this art to perform methods in accordance with principles described herein. Additionally, the methods which are described and illustrated herein are not limited to the exact sequence of acts described, nor are they necessarily limited to the practice of all of the acts set forth. Other sequences of events or acts, or less than all of the events, or simultaneous occurrence of the events, may be utilized in practicing the embodiments of the invention.

Referring back to FIG. 7, the systems shown in FIGS. 1-13 may be dropped from a rear ramp door 116 of the aircraft 92 (e.g., C-130). The rear ramp door 116 allows the system to be dropped gradually out of the slipstream of the aircraft 92. More particular, to deploy the system, the systems are armed and the rear ramp door 116 is opened. The aircraft 92 may be flying at a high rate of speed. However, the back edge of the rear ramp door 116 experiences a significantly slower wind speed since the back edge of the rear ramp door 116 is within the slipstream of the aircraft 92. Once the rear ramp door 116 is opened, the system is moved closer to the back edge of the rear ramp door 116. At the appropriate time, the system is pushed off of the back edge of the rear ramp door 116. The system begins to tilt and is caught within the moving air outside of the aircraft's slip stream. The moving air is significantly slower at this point compared to the relative air speed of the aircraft. Once the system is tilted beyond the tipping point, the cap or lid assembly of the system is separated from the sleeve or tote of the system. The system begins to fall away from the aircraft and away from the slipstream of the aircraft. As the system drops, the relative wind speed to the system increases thereby increasing pressure on the straps. The pressure placed on the straps are transferred to the bag, sleeve or tote. At some point in time, the pressure in the straps exceeds the strength of the bag, sleeve or tote so that the straps tear the bag, sleeve, or tote apart thereby dispersing the filler material. When the filler material is dispersed, the bag, sleeve or tote has fallen significantly below the aircraft and closer to the target location. Hence, the aircraft can fly higher while maintaining accuracy of the drop. Also, the filler material is dispersed at a point significantly outside of the slipstream of the aircraft.

The filler material or the material that may be filled within the bag, sleeve, or tote discussed herein may be a solid or liquid material for purposes of reseeding, spill containment, general marking, firefighting or material dispersement such as water, fire retardant material viscous material, pollution control substance, particulate, oil absorbent, etc. Any one or combination of these materials may be used in conjunction with any of the systems 10, 10*a*, 10*b* discussed herein.

Referring now to FIG. 15, an exploded view of another embodiment of the aerial delivery system 200 is shown. The aerial delivery system 200 includes a lid assembly 202, a sleeve 204, a bag 206, a lower support 208 and a pallet 210. The bag 206, sleeve 204 and lid assembly 202 have a system of straps 212-226 which are attached to each other so that upon deploying the aerial delivery system 200 out of a forward moving aircraft 92, the lid assembly 202 and the straps 220-226 behave as a parachute to pull up on the straps 212, 214 of the bag 206 to rupture the bag 206 and disburse its content or filler material (e.g., fire retardant material, water, etc.) and to pull up on the straps 216, 218 to rotate the system 200 to facilitate dispersion of the content or filler material of the bag 206 out of the sleeve 204.

The lid assembly 40 may be fabricated in the same manner discussed in relation to FIGS. 1-3 or FIG. 14. The lid assembly 202 may have four straps 220-226 that extend out from the cap 80 and the plurality of layers 42, 44, 46. The straps 226, 222 may be fabricated from a unitary elongate material. Similarly, the straps 220, 224 may be fabricated from a unitary elongate material. On the end portions of the straps 220-226, a connector such as a loop 228 may be formed. Additionally, the lid assembly 40 may be larger than the sleeve 204 so that the lid assembly 40 overhangs the sleeve 204. In this manner, as the aerial delivery system 200 is deployed from a forward moving aircraft 92, the overhang of the lid assembly 40 catches the slipstream to lift the lid assembly 40 away from the sleeve 204, the bag 206 and the lower support 208. The straps 220-226 pull the straps 212, 214, 216, 218 upward to rupture the bag 206 and rotate the sleeve 204 to facilitate dispersion of the contents or filler material contained within the bag 206. The unitary elongate material that forms the straps 226, 222 and the straps 220, 224 may each have a length of 30 feet from the loop 228. The loop 228 may be 10 inches and formed with an 8 inch weld.

The sleeve 204 may have a rectangular configuration. The sleeve 204 may have upper and/or lower gussets 230 with a gap 232 therebetween through which the bag 206 may be inserted into the sleeve 204 prior to filling the bag 206 with the content or filler material. When the bag 206 is filled with the content or filler material, the weight of the content or filler material pushes outward on the sleeve 204. Fortunately, due to the heavy duty construction of the sleeve 204, the sleeve 204 is sufficiently rigid and strong so that the aerial delivery system 200 may be safely filled and transported to the aircraft 92 until deployment of the aerial delivery system 200. By way of example and not limitation, the sleeve 204 may be fabricated from a wound corrugated single face laminating process which produces a multi-wall seamless sleeve 204.

The gussets 230 may be fabricated from a thin corrugated material sufficient to be ripped by the straps 212, 214 of the bag 206 as the force produced by the lid assembly 202 traverses the straps 212, 214 of the bag 206 toward the corner 234 when the aerial delivery system 200 is deployed from the aircraft 92. The gussets 230 are also strong enough to retain the bag 206 filled with filler material or content in the sleeve even during negative gravity situations in the aircraft 92. The gussets 230 may extend across and adhere to adjacent flat panels 236 of the sleeve 204. Two gussets 230 may be disposed at the upper end of the sleeve 204. Additionally, two gussets 230 may also be disposed at the lower end of the sleeve 204. The gussets 230 may have a cutout 238 which forms an opening 240 along with the sleeve 204. The straps 212 and 214 of the bag 206 may be fed through the opening 240 and protrude upward out of the sleeve 204. The straps 212, 214 may be sufficiently long so that their loops may be routed to an attached to the loops of the sleeve straps 218, 216. The gussets 230 may also have an opening 242 which is sized and configured to receive vertical restraint straps 244 which are used to secure the sleeve 204 to the lower support 208.

Figure 16:
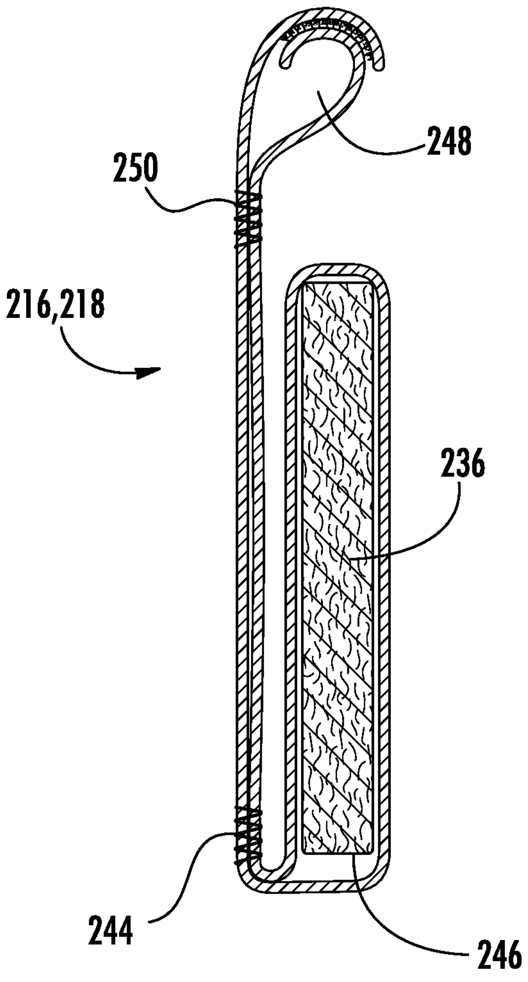
FIG. 16 is a cross sectional view of a panel of a sleeve with a strap secured to the sleeve for rotating the sleeve upon dropping the system from a forward moving aircraft.

The straps 216, 218 may be secured to adjacent panels 236 of the sleeve 204 near the corner 234, and more particularly to the bottom side of the corner 234 of the sleeve 204. To secure the straps 216, 218 to the sleeve 204, the straps 216, 218 may be wrapped around the vertical height of the adjacent panels 236, as shown in FIG. 16. After wrapping the strap 216, 218 around the vertical height of the panel 236, the strap 216 is secured (e.g., tape) upon itself at point 244 which is at a lower half of the panel 236, and more preferably at a lower edge 246 of the panel 236. The remaining portion of the strap 216, 218 extends away from the lower half of the panel 236. Moreover, the remaining portion of the strap 216 may form a loop 248 by securing (e.g., tape) the strap 216 upon itself at point 250 and securing the distal ends of the strap 216 together. The strap 216 may be secured upon itself at point 244 and point 250 with hooks and loops, tape, duct tape, adhesive, stitching, staples or other methods and means known in the art or developed in the future. The distal ends of the strap 216 may be secured to each other with hooks and loops, tape, duct tape, adhesive, stitching, staples or other methods and means known in the art or developed in the future.

When the aerial delivery system 200 is dropped from or deployed off of a forward moving aircraft 92, the lid assembly 202 pulls up on the straps 216, 218 due to a connection with the straps 220-226 of the lid assembly 202. This upward pull causes the aerial delivery system 200 to rotate and further causes the bag 206 and its content or filler material to be distributed out of the sleeve 204. Additionally, the straps 212, 214 are also respectively secured to straps 216, 218. Such connection causes the straps 212, 214 to be traversed toward the corner 234 which also causes the gussets 230 to rip along the upper edge of the adjacent panel 236 of the corner 234. Ripping the gussets 230 further facilitates expulsion of the bag 206 and content or filler material within the bag 206 out f and away from the sleeve 204.

The lower support 208 may be larger than the sleeve 204 so that the entire bottom edge of the sleeve 204 may rest on the lower support 208. The lower support 208 may be about 48"×48" but may be larger or smaller depending on the capacity of the aerial support system 200. The corners of the lower support 208 may be rounded or beleved to facilitate loading. The lower support 208 may be fabricated from a wood or fiber material. Additionally, the lower support 208 may have holes 252. A pair of holes 252 may be located on one side of the lower support 208. A second pair of holes 252 may be located on an opposed side of the lower support 208. The pair of holes 252 may be positioned so as to be aligned to the opposed panels 236 of the sleeve 204. Additionally, the pair of holes 252 is gapped apart so that an inner hole 252 is disposed interior to the sleeve 204 and an outer hole 252 is disposed exterior to the sleeve 204. The sleeve 204 may be secured permanently to the lower support 208 by way of vertical restraint straps 243. In particular, the vertical restraint straps 243 are fed through the pairs of holes 252 and secured to each other over the top edge of the sleeve 204. Preferably, the distal end portions of the vertical restraint strap 243 have hooks and loops 254 which are positioned on the upper edge of the sleeve 204.

When preparing to deploy the aerial delivery system 200, the aerial delivery system 200 is set up on a pallet 256. The pallet 256 is inverted so that the supports 258 are above the base 260 for the purposes of removal of the aerial delivery system 200 with a forklift onto the forward moving aircraft 92. The pallet 256 is only for setup and not deployment on the aircraft 92.

Figure 17:
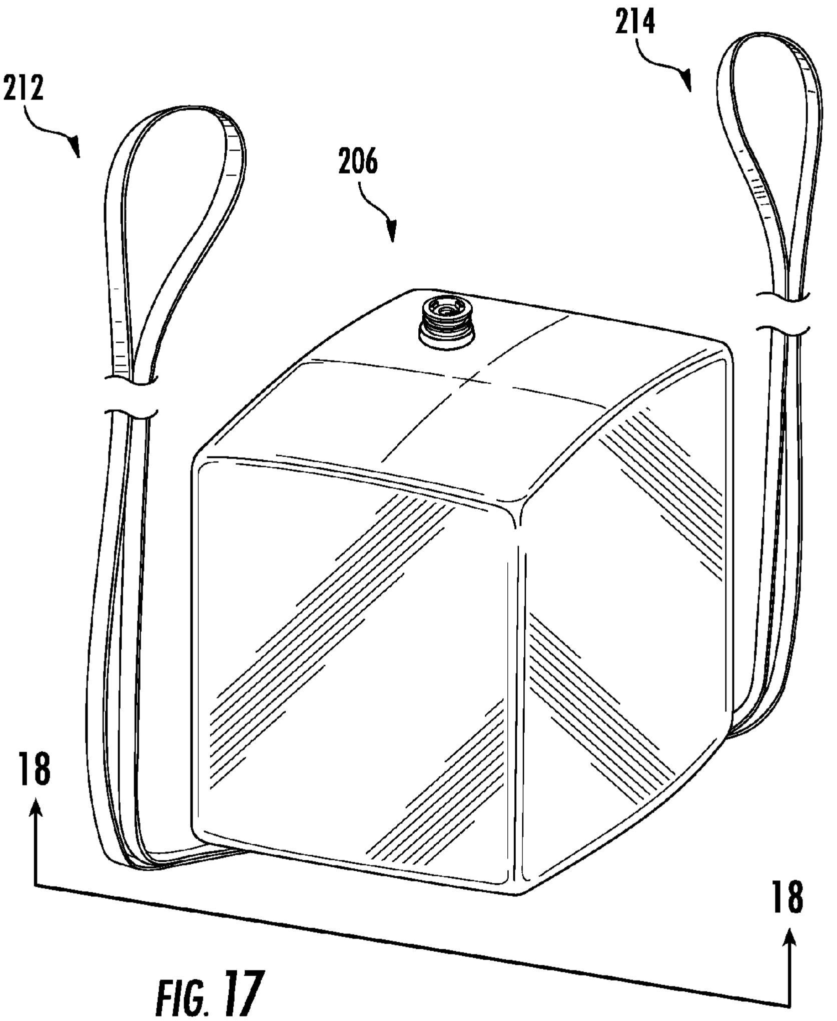
FIG. 17 is a perspective view of a bag of the system shown in FIG. 15 for containing filler material or content to be dropped from the forward moving aircraft.
Figure 18:
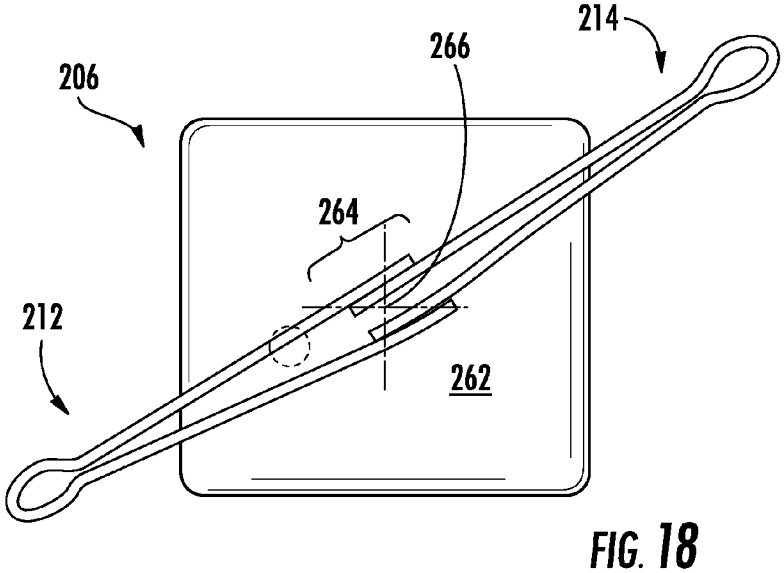
FIG. 18 is a bottom view of the bag shown in FIG. 17.

Referring now to FIGS. 17 and 18, a perspective and bottom view of the bag 206 is shown. The bag 206 may be fabricated with the materials discussed herein and other similar materials. The straps 212 and 214 are secured to a lower surface 262 of the bag 206. In particular, each of the straps 212, 214 is fabricated from an elongate unitary material. Opposed distal portions 264 of the straps 212, 214 are attached (e.g., welded) to the lower surface 262 of the bag 206 for about 18 inches. Preferably, the attachment is continuous and extends beyond a center 266 of the lower surface of the bay about 4 inches. Strap 214 may extend out in a first direction. Strap 212 may extend out in a second direction which is opposite from the first direction. When the bag 206 is deployed and filled within the sleeve 204, the straps 212, 214 extend upward and through the holes 240 formed by the gussets 230. The straps 212, 214 are sufficiently long to be routed to the corner 234 to attach the loops of straps 212, 214 to loops of straps 218, 216. When the lid assembly 202 is caught by the slipstream of the forward moving aircraft 92, the lid assembly 202 pulls up on the straps 212, 214 to rip the lower surface 262 of the bag 206 and facilitate disbursement of the content or filler material within the bag 206.

Figure 19:
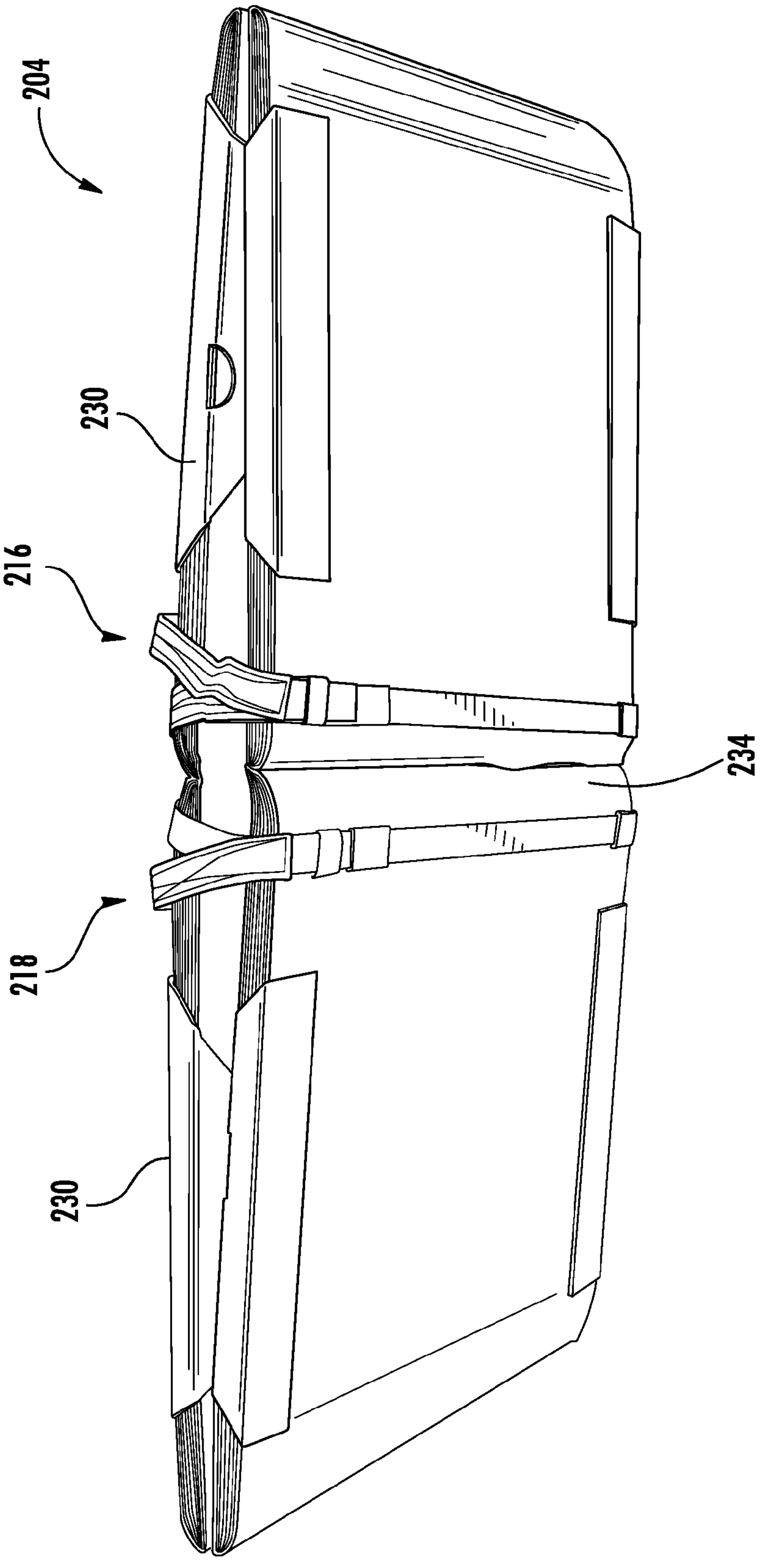
FIG. 19 is a perspective view of a folded sleeve.
Figure 20:
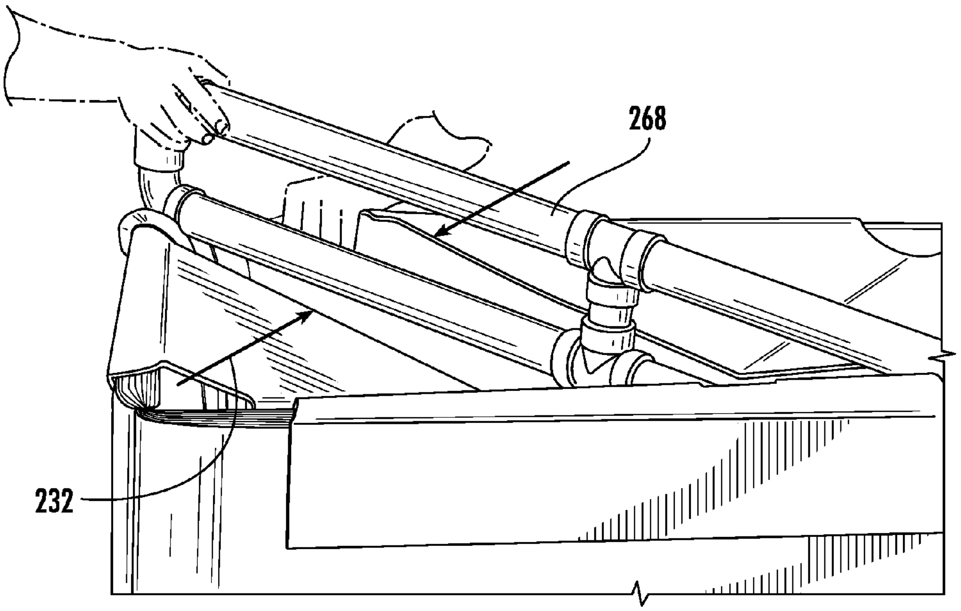
FIG. 20 illustrates a squaring device inserted into the sleeve for holding the sleeve shown in FIG. 19 in the squared configuration.
Figure 21:
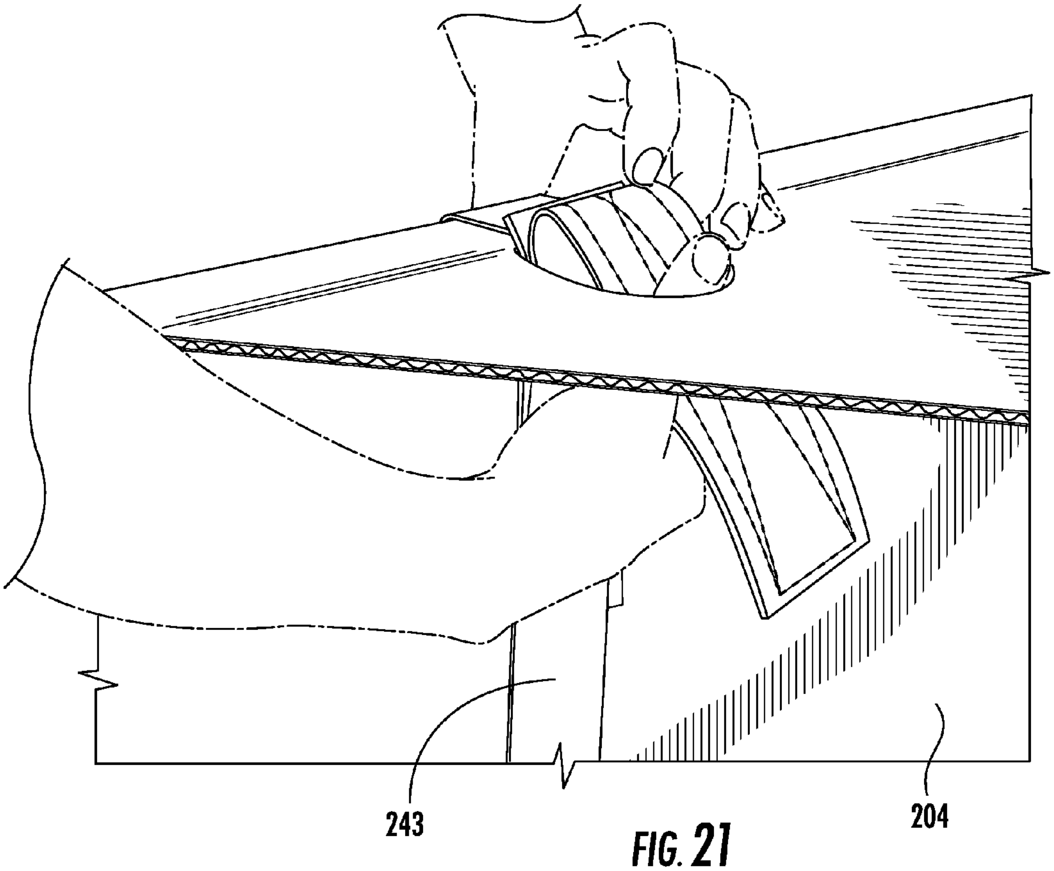
FIG. 21 is a close up view of the sleeve with a vertical restraint strap for securing the sleeve to a lower support.
Figure 22:
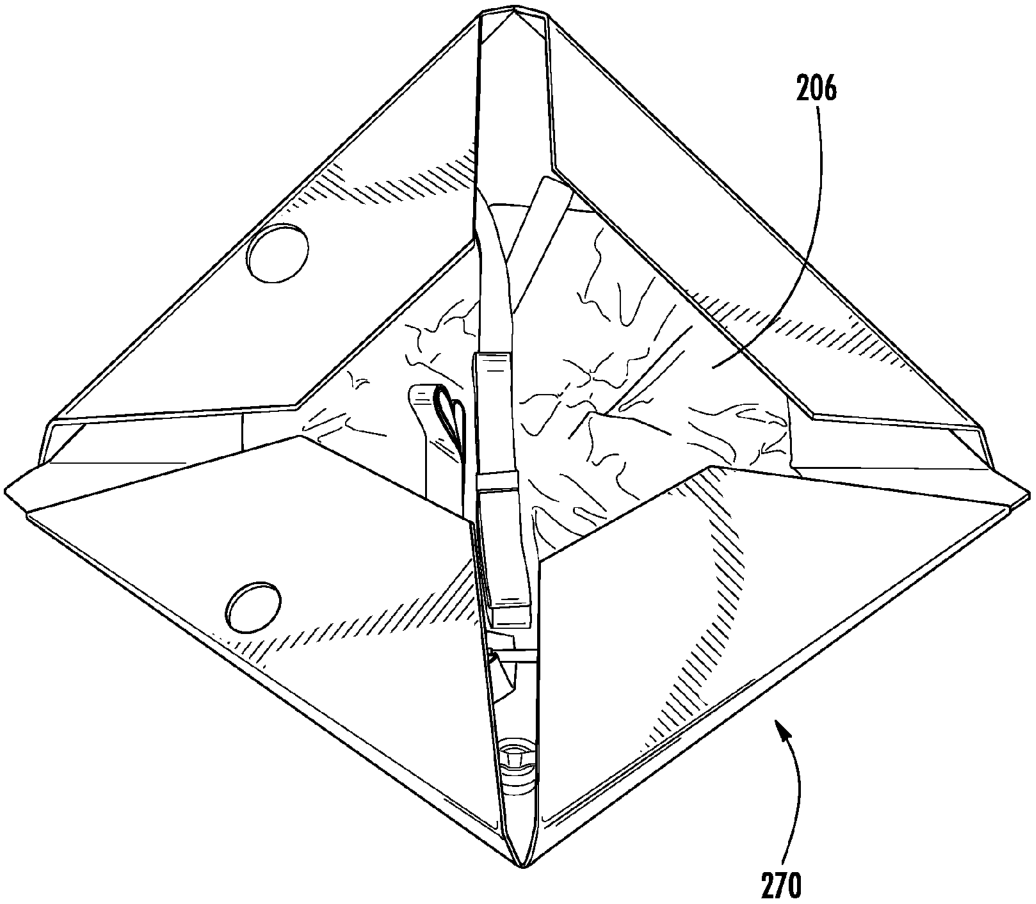
FIG. 22 is an unfolded view of the cassette containing the bag prior to filling.
Figure 23:
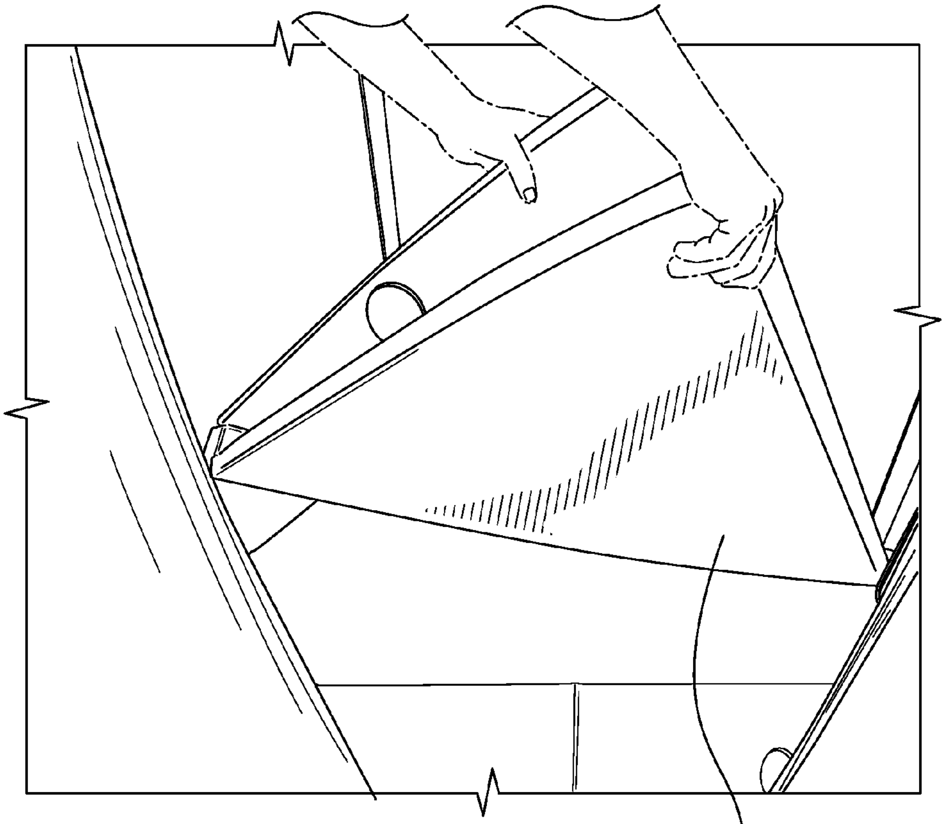
FIG. 23 is a view of the sleeve with the cassette being unfolded to position the bag in the sleeve.
Figure 24:
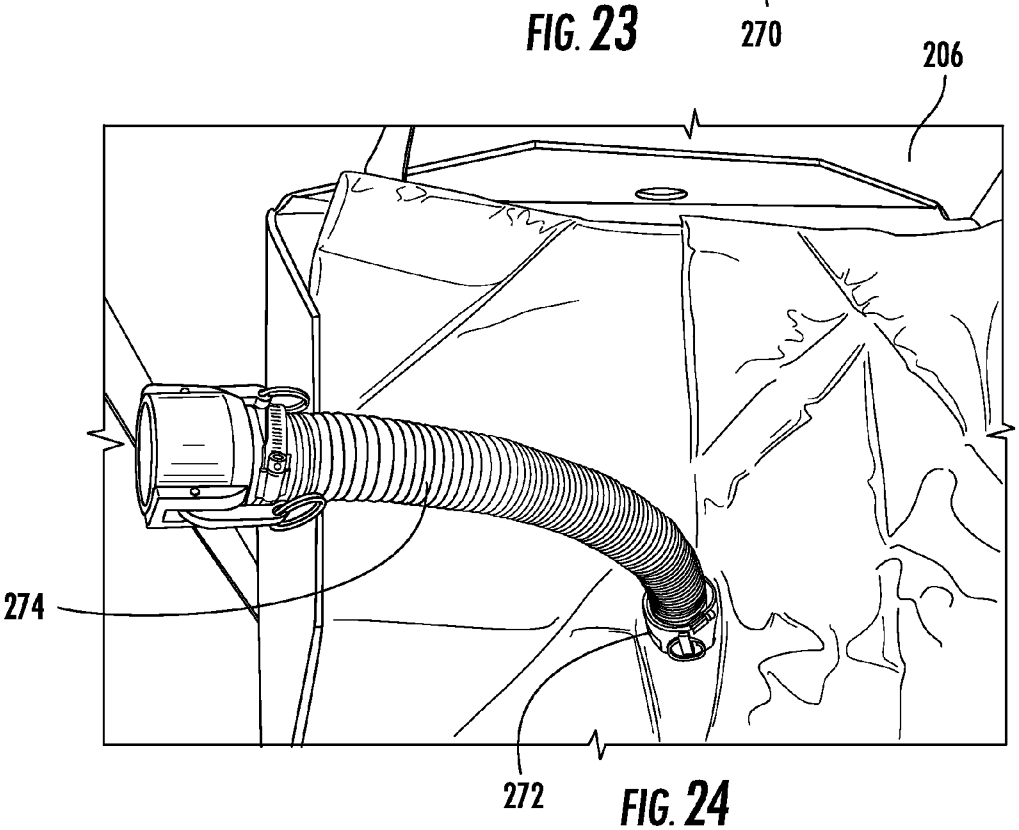
FIG. 24 is a view of the bag with a hose connected to the bag with a quick disconnect coupler.

To set up the aerial delivery system 200, the sleeve 204 is provided in the collapsed configuration, as shown in FIG. 19. In this position, the gussets 230 are folded into the interior of the sleeve 204. The straps 216, 218 are already attached and secured to the sleeve 204 at the corner 234, and more particularly, to the lower side or edge of corner 234. The user lays down the pallet 256 upside down as shown in the configuration shown in FIG. 15. The lower support 208 is placed on top of the pallet 210. The sleeve 204 shown in FIG. 19 is spread open and a squaring device 268 is inserted into the gap 232 to hold open the sleeve 204 in the square configuration. The vertical restraint straps 243 are then set to secure the sleeve 204 to the lower support 208. The hooks and loops disposed at the opposed distal end portions of the vertical restraint straps 243 are attached to each other and positioned at the upper edge of the sleeve 204. At this point, the sleeve 204 is secured to the lower support 208. Also the squaring device 268 may be removed from the sleeve 204. The bag 206 may be provided to the user in a cassette 270 in the folded position shown in FIG. 23. The cassette 270 is inserted through the gap 232 defined by the gussets 230. The cassette 270 is positioned on top of the lower support 28 and unfolded as shown in FIG. 22. When the cassette 270 is unfolded, a port 272 is attachable to a hose 274 which can fill the bag 206 with the content or filler material. The port 272 and the hose 274 may have a male and female mating quick release coupler. Before filling the bag 206 with the content or filler material, the straps 212, 214 of the bag 206 may be fed through the holes 240 defined by the gussets 230 and the sleeve 204. The bag 206 is now filled with the content or filler material (e.g., water, fire retardant material, etc.). As the bag 206 is filled with the content or filler material, the bag 206 presses against the sleeve 204 and applies pressure to the straps 212, 214 of the bag 206. When the appropriate amount of content or filler material is filled within the bag 206, the port 272 is closed with a lid.

The aerial delivery system 200 may now be armed so that upon dropping the aerial delivery system 200 from a forward moving aircraft 92, the content or filler material is dispersed to a target on the ground. In particular, the loop of strap 212 of the bag 206 is secured to the loop of strap 218 of the sleeve 204 at the distal end portions thereof. Additionally, the loop of the strap 214 of the bag 206 is secured to the loop of the strap 216 of the sleeve 204 at the distal end portions thereof. Additionally, the loops of the straps 226 and 222 of the lid assembly 202 are secured to one of the loops of the sleeve straps 216, 218. The straps 226 and 222 are formed from the same elongate unitary material. Additionally, the loops of the straps 224, 228 of the lid assembly 202 are secured to the other one of the loops of the sleeve straps 216, 218. The loops may be connected to each other with zip ties. The straps 224, 228 are formed from the same elongate unitary material. The lid assembly 202 is placed over the top of the sleeve 204. The straps 212, 214 of the bag 206, the straps 216, 218 of the sleeve 204 and the straps 220-226 of the lid assembly 202 may be tucked under the lid assembly 202 after the system 200 is armed and while waiting to be dropped from a forward moving aircraft 92. As discussed previously, the lid assembly 202 is larger than the sleeve 204 and may overhang the sleeve 204 so that the lid assembly 202 may be caught within the slipstream of the forward moving aircraft 92 to pull upon the straps 218, 216 of the sleeve 204 and the straps 212, 214 of the bag 206. The straps 220-226 of the lid assembly 202 may be sufficiently long to allow the aerial delivery system 200 to drop significantly below the aircraft 92 prior to disbursement of the filler material or content of the bag 206 as discussed above. After the aerial delivery system 200 has significantly dropped below the aircraft 92, the straps 212-218 are placed in tension by the straps 220-226. The straps 212, 214 of the bag 206 begin to rip the gussets 230. By ripping the gussets 230, the bag 206 is allowed to be poured out of the sleeve 204. The straps 212, 214 are traversed toward the corner 234 of the sleeve 204. Additionally, the straps 212, 214 rip the lower surface of the bag 206 to disburse the filler material or content of the bag 206. The straps 216, 218 lift the bottom of the sleeve 204 to rotate the aerial delivery system 200 in the air after the area delivery system 200 is dropped off of the forward moving aircraft 92.

The aerial delivery system 200 is also held together throughout its entire descent from the forward moving aircraft 92 to the ground. In particular, the straps 212-226 hold the bag 206 and sleeve 204 together. The lower support 208 is held to the sleeve 204 by way of the vertical restraint straps 243. This provides for the safe descent of the aerial delivery system 200.

Figure 25:
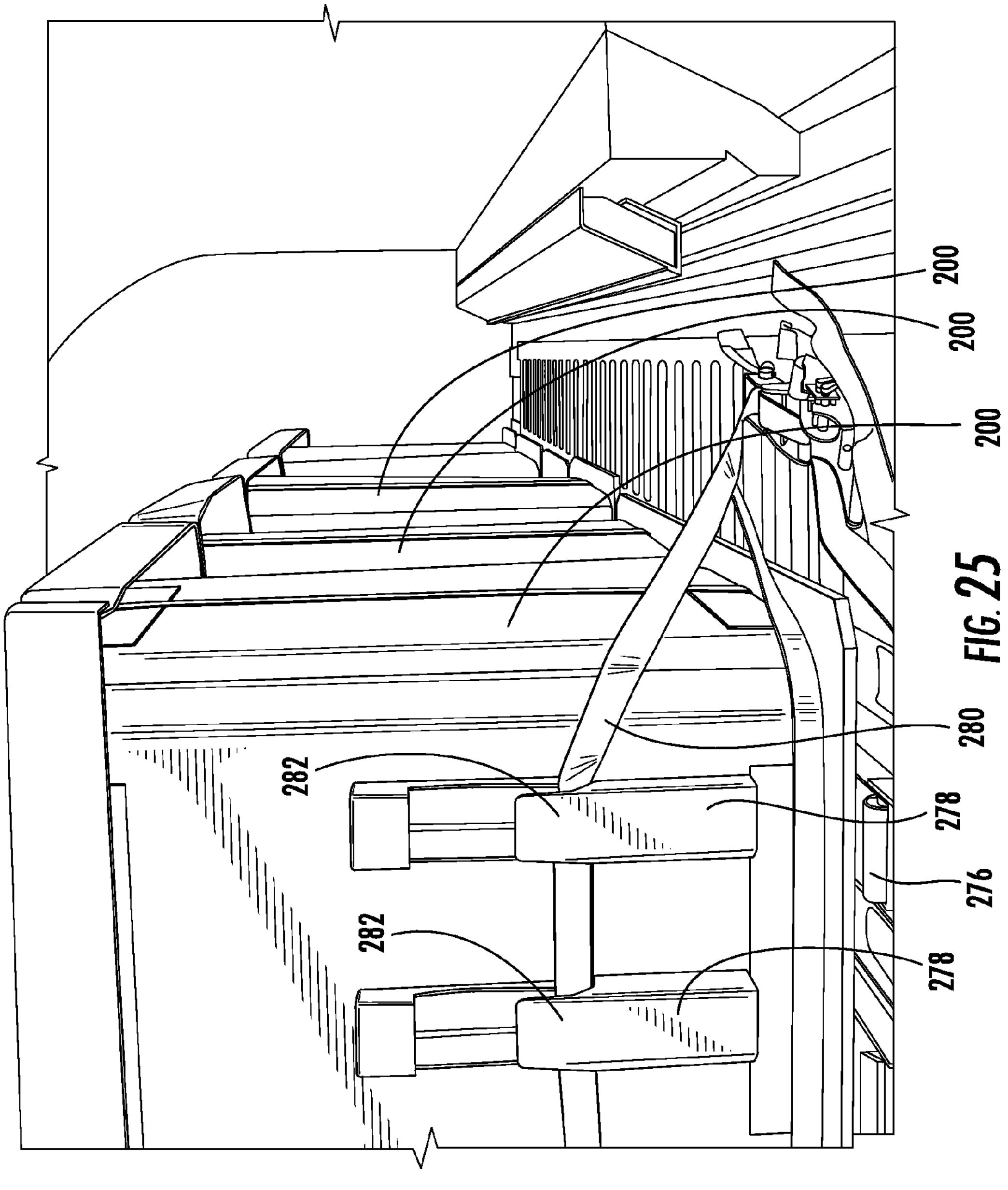
FIG. 25 illustrates a plurality of aerial delivery systems loaded on a rear ramp of the forward moving aircraft.

After rigging the aerial delivery system 200, the aerial delivery system 200 may be loaded onto the aircraft 92. To do so, a forklift may pick up the lower support 208 and move the aerial delivery system 200 onto a rear ramp of the aircraft 92 as shown in FIG. 25. The rear ramp may have a plurality of rollers 276 which allow the aerial delivery system 200 to be rolled deeper into the aircraft 92. After loading the aircraft 92 with a number of aerial delivery systems 200, one or more load retention blocks 278 may be attached to the first and last aerial delivery systems 200. Tie down straps 280 can be fed through the load retention block 278 to hold the aerial delivery systems 200 in place as the plane accelerates and decelerates. The load retention block 278 may be fabricated from a corrugated material and have a hook 282 which catches the tie down straps 280. The load retention block 278 may be attached to the exterior of the sleeve 204 by way of adhesive, stapling and attachment methods known in the art or developed in the future.

The aerial delivery system 200 and its components may be sized and configured to contain approximately 100 to 500 gallons (e.g., 100, 150, 200, 220, 230, 250, 300, 350, 400, 450, 500 gallons, volumes between such values, etc.) of water, other fluid, ***, powders, solids and/or other materials.

The above description is given by way of example, and not limitation. Given the above disclosure, one skilled in the art could devise variations that are within the scope and spirit of the invention disclosed herein, including various ways of forming the sleeve or tote. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A fire fighting device released from a forward moving aircraft, the device comprising:

a rupturable inner bladder for containing fire fighting material, the inner bladder defining a lower surface;

a first bladder strap defining first and second portions, the first portion of the first bladder strap being secured to the lower surface of the inner bladder, the second portion having a first bladder strap connector;

an exterior sleeve for containing the rupturable inner bladder and sufficiently rigid to minimize bulging of the sleeve when the inner bladder contains the fire fighting material;

a first sleeve strap defining first and second portions, the first portion attached to a lower half of the sleeve and the first sleeve strap disposed exterior to the sleeve, the second portion having a first sleeve strap connector;

a lid having a sufficiently large surface area to catch a slip stream of the forward moving aircraft for rotating the fire fighting device;

a first lid strap defining first and second portions, the first portion attached to the lid, the second portion having a first lid strap connector;

wherein the first bladder strap connector and the first lid strap connector is connectable so that the lid pulls up on the lower half of the sleeve to rotate the device after being released from the forward moving aircraft.

2. The device of claim 1 further comprising a platform for supporting the sleeve and the inner bladder, the sleeve being secured to the platform.

3. The device of claim 1 further comprising:

a second bladder strap defining first and second portions, the first portion of the second bladder strap being secured to the lower surface of the inner bladder, the second portion having a second bladder strap connector;

a second sleeve strap being positioned adjacent to the first sleeve strap, the second sleeve strap defining first and second portions, the first portion attached to a lower half of the sleeve and the second sleeve strap disposed exterior to the sleeve, the second portion having a second sleeve strap connector;

a second lid strap defining first and second portions, the first portion attached to the lid, the second portion having a second lid strap connector;

wherein the second bladder strap connector and the second lid strap connector is connectable to the second sleeve strap connector for arming the system.

4. The device of claim 3 wherein the first portions of the first and second bladder straps are distal end portions of a unitary elongate material which are secured to the lower surface 4 inches past a center of the lower surface, the second portions of the first and second bladder straps are distal end portions of a unitary elongate material which are secured to the lower surface 4 inches past the center of the lower surface, and wherein the first and second bladder straps extend outward in opposite directions.

5. The device of claim 3 wherein the first lid strap has opposed end portions that extend outward from the lid in opposite directions, the opposed end portions of the first lid strap having a pair of first lid strap connectors, and the second lid strap has opposed end portions that extend outward from the lid in opposite directions and generally perpendicular to the first lid strap, the opposed end portions of the second lid strap having a pair of second lid strap connectors.

6. The device of claim 3 wherein the first and second sleeve straps are positioned on adjacent sides of the sleeve having a common corner.

7. The device of claim 6 wherein the first and second sleeve straps are positioned closer to the common corner than the opposed corners of the adjacent sides of the sleeve.

8. The device of claim 1 further comprising an upper rupturable panel disposed over an upper opening of the sleeve to retain the inner bladder filled with fire fighting material when the forward moving aircraft maneuvers to impose a negative gravity environment.

9. The device of claim 8 wherein the first bladder strap is routed to an exterior envelope of the sleeve through the rupturable panel.

10. The device of claim 1 wherein the first bladder strap connector, the first sleeve strap connector and the first lid strap connector has a loop configuration.

11. The device of claim 10 further comprising zip ties for connecting the first bladder strap connector, the first sleeve strap connector and the first lid strap connector together to arm the device for deployment.

12. A method of dropping firefighting material onto a fire, the method comprising the steps of:

providing an apparatus having an outer support and an inner bladder, the bladder being fillable with the firefighting material, the outer support capable of propping up the bladder after being filled with firefighting material and for facilitating transportation of the filled inner bladder;

loading the filled apparatus onto an airplane;

unloading the filled apparatus off of a rear access ramp of the airplane while the airplane is in flight;

destabilizing the filled apparatus after the unloading step; and extracting the firefighting material from the outer support;

wherein the destabilizing step comprises the steps of:

catching a parachute of the apparatus in a slip stream of the aircraft;

pulling up on one or more parachute lines routed from the parachute into a lower half of the support to destabilize the apparatus and disburse the firefighting material within the inner bladder onto the fire; and wherein the extracting step comprises the step of:

ripping the inner bladder with the one or more parachute lines which are secured to the inner bladder.

13. A method of dropping firefighting material onto a fire, the method comprising the steps of:

providing an apparatus having an outer support and an inner bladder, the bladder being fillable with the firefighting material, the outer support capable of propping up the bladder after being filled with firefighting material and for facilitating transportation of the filled inner bladder;

loading the filled apparatus onto an airplane;

unloading the filled apparatus off of a rear access ramp of the airplane while the airplane is in flight;

destabilizing the filled apparatus after the unloading step; and extracting the firefighting material from the outer support;

wherein the destabilizing step comprises the steps of:

catching a parachute of the apparatus in a slip stream of the aircraft;

pulling up on one or more parachute lines routed from the parachute into a lower half of the support to destabilize the apparatus and disburse the firefighting material within the inner bladder onto the fire; and wherein the extracting step comprises the step of ripping a bottom portion of the inner bladder with the one or more parachute lines which are secured to the bottom portion of the inner bladder.

* * * * *